(12) United States Patent
Kusashima et al.

(10) Patent No.: US 11,496,975 B2
(45) Date of Patent: Nov. 8, 2022

(54) COMMUNICATION DEVICE, COMMUNICATION METHOD, AND PROGRAM

(71) Applicant: Sony Corporation, Tokyo (JP)

(72) Inventors: Naoki Kusashima, Tokyo (JP); Hiromasa Uchiyama, Tokyo (JP); Yifu Tang, Tokyo (JP); Hiroki Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 58 days.

(21) Appl. No.: 17/277,328

(22) PCT Filed: Sep. 13, 2019

(86) PCT No.: PCT/JP2019/036110
§ 371 (c)(1),
(2) Date: Mar. 18, 2021

(87) PCT Pub. No.: WO2020/066696
PCT Pub. Date: Apr. 2, 2020

(65) Prior Publication Data
US 2021/0352599 A1    Nov. 11, 2021

(30) Foreign Application Priority Data
Sep. 27, 2018  (JP) .............................. JP2018-181282

(51) Int. Cl.
*H04W 56/00* (2009.01)
*G01S 19/25* (2010.01)
(Continued)

(52) U.S. Cl.
CPC ......... *H04W 56/001* (2013.01); *G01S 19/256* (2013.01); *H04L 1/1614* (2013.01); *H04W 56/005* (2013.01); *H04W 92/18* (2013.01)

(58) Field of Classification Search
None
See application file for complete search history.

(56) References Cited

U.S. PATENT DOCUMENTS

2016/0095074 A1* 3/2016 Park ..................... H04W 72/10
                                                      370/350
2018/0167946 A1* 6/2018 Si ............................ H04L 5/00
(Continued)

FOREIGN PATENT DOCUMENTS

| EP | 3 829 123 A1 | 6/2021 |
| WO | WO-2019016987 A1 * | 1/2019 |
| WO | 2019/029814 A1 | 2/2019 |

OTHER PUBLICATIONS

International Search Report and Written Opinion dated Dec. 10, 2019, received for PCT Application PCT/JP2019/036110, Filed on Sep. 13, 2019, 14 pages including English Translation.
(Continued)

*Primary Examiner* — Anh Vu H Ly
(74) *Attorney, Agent, or Firm* — Xsensus LLP

(57) ABSTRACT

A communication device includes: a communication unit that performs wireless communication; and a control unit (103) that performs control so that a plurality of synchronization signals is patterned and arranged in regions to which resources of the wireless communication are allocated and is transmitted to another terminal device, the plurality of synchronization signals being associated with each of a plurality of beams allocated to be available for inter-device communication between different terminal devices, in which the control unit (103) performs control so that a pattern in which the plurality of synchronization signals is arranged is switched according to a predetermined condition.

20 Claims, 25 Drawing Sheets

(51) Int. Cl.
*H04L 1/16* (2006.01)
*H04W 92/18* (2009.01)

(56) References Cited

U.S. PATENT DOCUMENTS

| | | | |
|---|---|---|---|
| 2018/0248642 A1* | 8/2018 | Si | H04L 5/0053 |
| 2018/0287840 A1* | 10/2018 | Akkarakaran | H04L 27/2692 |
| 2018/0352524 A1* | 12/2018 | Abedini | H04L 5/005 |
| 2018/0376454 A1* | 12/2018 | Åström | H04W 72/0446 |
| 2019/0028244 A1* | 1/2019 | Si | H04W 72/042 |
| 2019/0037609 A1* | 1/2019 | Harada | H04W 74/0841 |
| 2019/0053174 A1* | 2/2019 | Nangia | H04W 72/1289 |
| 2019/0090210 A1* | 3/2019 | Islam | H04W 56/001 |
| 2019/0261315 A1* | 8/2019 | Zhang | H04L 27/0012 |
| 2019/0313351 A1* | 10/2019 | Kim | H04W 56/001 |
| 2020/0045664 A1* | 2/2020 | Choi | H04B 17/318 |

OTHER PUBLICATIONS

Vodafone, "New SID: Study on NR V2X", RP-181429, 3GPP TSG RAN Meeting # 80, Jun. 11-14, 2018. 5 pages.
CATT, "Summary of Offline Discussion on Sidelink Synchronization in NR V2X", R1-1809818, 3GPP TSG RAN WG1 Meeting #94, Aug. 19-24, 2018, 3 pages.
ETRI, "Discussion on NR V2X Sidelink Synchronization", R1-1808814, 3GPP TSG RAN WG1 #94, Aug. 20-24, 2018, pp. 1-6.
Sharp, "DL synchronization signal structure in NR", 3GPP TSG RAN WG1 NR Ad-Hoc Meeting, R1-1703234, Athens, Greece, Feb. 13-17, 2017, 4 pages, XP051210366.

\* cited by examiner

COMMUNICATION DEVICE, COMMUNICATION METHOD, AND PROGRAM

CROSS-REFERENCE TO RELATED APPLICATIONS

The present application is based on PCT filing PCT/JP2019/036110, filed Sep. 13, 2019, which claims priority to JP 2018-181282, filed Sep. 27, 2018, the entire contents of each are incorporated herein by reference.

TECHNICAL FIELD

The present disclosure relates to a communication device, a communication method, and a program.

BACKGROUND ART

A wireless access manner and a wireless network (hereinafter, referred to as "long term evolution (LTE)", "LTE-advanced (LTE-A)", "LTE-advanced pro (LTE-A Pro)", "new radio (NR)", "new radio access technology (NRAT)", "evolved universal terrestrial radio access (EUTRA)", or "further EUTRA (FEUTRA)") of cellular mobile communication have been studied in the 3rd Generation Partnership Project (3GPP). Note that in the following description, LTE includes LTE-A, LTE-A Pro, and EUTRA, and NR includes NRAT and FEUTRA. In the LTE and the NR, a base station device (base station) is also called an evolved NodeB (eNodeB), and a terminal device (mobile station, mobile station device, or terminal) is also called user equipment (UE). The LTE and the NR are cellular communication systems in which a plurality of areas covered by the base station device is arranged in a cell shape. A single base station device may manage a plurality of cells.

In the LTE, various types of communication in a vehicle (vehicle-to-anything (V2X) communication) such as vehicle-to-vehicle (V2V) communication, vehicle-to-pedestrian (V2P) communication, vehicle-to-infrastructure/network (V2I/N), and the like, have been supported. The V2X in the LTE supports use cases such as driving assistance or autonomous driving, a warning to a pedestrian, and the like. A sidelink (also referred to as device to device (D2D) communication) is used in order to support the V2X.

Moreover, in the NR, in addition to supporting a V2X use case of the LTE, it has been required to support use cases with higher requirements, such as vehicles platooning, extended sensors, advanced driving, remote driving, or the like. In order to support these use cases, a higher throughput, lower latency, and higher reliability have been required, such that an operation in a millimeter wave such as a 60 GHz band or the like has also been studied. Details of the V2X in the NR are disclosed in Non-Patent Document 1.

CITATION LIST

Non-Patent Document

Non-Patent Document 1: RP-181429, Vodafone, "New SID: Study on NR V2X," 3GPP TSG RAN Meeting #80, La Jolla, USA, Jun. 11-14, 2018.

SUMMARY OF THE INVENTION

Problems to be Solved by the Invention

Meanwhile, the millimeter wave has significant radio wave attenuation, such that communication using the millimeter wave may require a technology called beamforming, which is also similar for V2X communication (for example, V2V communication) of the NR. Furthermore, in the V2X communication of the NR, there may be a restriction called a so-called half duplex (HD). Due to such a factor, in the V2X communication of the NR, a situation in which it takes time for establishment of communication (setup for connection), such that communication becomes unstable can be assumed.

Therefore, the present disclosure proposes a technology capable of realizing establishment of communication between terminals in which application of NR is assumed, in a more suitable manner.

Solutions to Problems

According to the present disclosure, there is provided a communication device including: a communication unit that performs wireless communication; and a control unit that performs control so that a plurality of synchronization signals is patterned and arranged in regions to which resources of the wireless communication are allocated and is transmitted to another terminal device, the plurality of synchronization signals being associated with each of a plurality of beams allocated to be available for inter-device communication between different terminal devices, in which the control unit performs control so that a pattern in which the plurality of synchronization signals is arranged is switched according to a predetermined condition.

Furthermore, according to the present disclosure, there is provided a communication device including: a communication unit that performs wireless communication; and a control unit performs control so that a plurality of synchronization signals transmitted from another terminal device and associated with each of a plurality of beams allocated to be available for inter-device communication between different terminal devices is received, in which the control unit performs control so that information regarding switching of a pattern in which the plurality of synchronization signals is arranged in regions to which resources of the wireless communication are allocated is acquired from the another terminal device, in a case where the pattern is switched.

Furthermore, according to the present disclosure, there is provided a communication method executed by a computer, including: performing wireless communication; performing control so that a plurality of synchronization signals is patterned and arranged in regions to which resources of the wireless communication are allocated and is transmitted to another terminal device, the plurality of synchronization signals being associated with each of a plurality of beams allocated to be available for inter-device communication between different terminal devices; and performing control so that a pattern in which the plurality of synchronization signals is arranged is switched according to a predetermined condition.

Furthermore, according to the present disclosure, there is provided a communication method executed by a computer, including: performing wireless communication; performing control so that a plurality of synchronization signals transmitted from another terminal device and associated with each of a plurality of beams allocated to be available for inter-device communication between different terminal devices is received; and performing control so that information regarding switching of a pattern in which the plurality of synchronization signals is arranged in regions to which resources of the wireless communication are allocated is acquired from the another terminal device, in a case where the pattern is switched.

Furthermore, according to the present disclosure, there is provided a program for causing a computer to execute the following steps of: performing wireless communication; performing control so that a plurality of synchronization signals is patterned and arranged in regions to which resources of the wireless communication are allocated and is transmitted to another terminal device, the plurality of synchronization signals being associated with each of a plurality of beams allocated to be available for inter-device communication between different terminal devices; and performing control so that a pattern in which the plurality of synchronization signals is arranged is switched according to a predetermined condition.

Furthermore, according to the present disclosure, there is provided a program for causing a computer to execute the following steps of: performing wireless communication; performing control so that a plurality of synchronization signals transmitted from another terminal device and associated with each of a plurality of beams allocated to be available for inter-device communication between different terminal devices is received; and performing control so that information regarding switching of a pattern in which the plurality of synchronization signals is arranged in regions to which resources of the wireless communication are allocated is acquired from the another terminal device, in a case where the pattern is switched.

Furthermore, according to the present disclosure, there is provided a communication device including: a communication unit that performs wireless communication; and a control unit that independently controls a first transmission timing of first communication with destination designation and a second transmission timing of second communication without destination designation among inter-device communication between different terminal devices.

Furthermore, according to the present disclosure, there is provided a communication method executed by a computer, including: performing wireless communication; and independently controlling a first transmission timing of first communication with destination designation and a second transmission timing of second communication without destination designation among inter-device communication between different terminal devices.

Furthermore, according to the present disclosure, there is provided a program for causing a computer to execute the following steps of: performing wireless communication; and independently controlling a first transmission timing of first communication with destination designation and a second transmission timing of second communication without destination designation among inter-device communication between different terminal devices.

Effects of the Invention

As described above, according to the present disclosure, a technology capable of realizing establishment of communication between terminals in which application of NR is assumed, in a more suitable manner is provided.

Note that the effect described above is not necessarily restrictive, and any effect set forth in the present specification or other effects that can be grasped from the present specification may be accomplished together with or instead of the effect described above.

MODE FOR CARRYING OUT THE INVENTION

Figure 1:
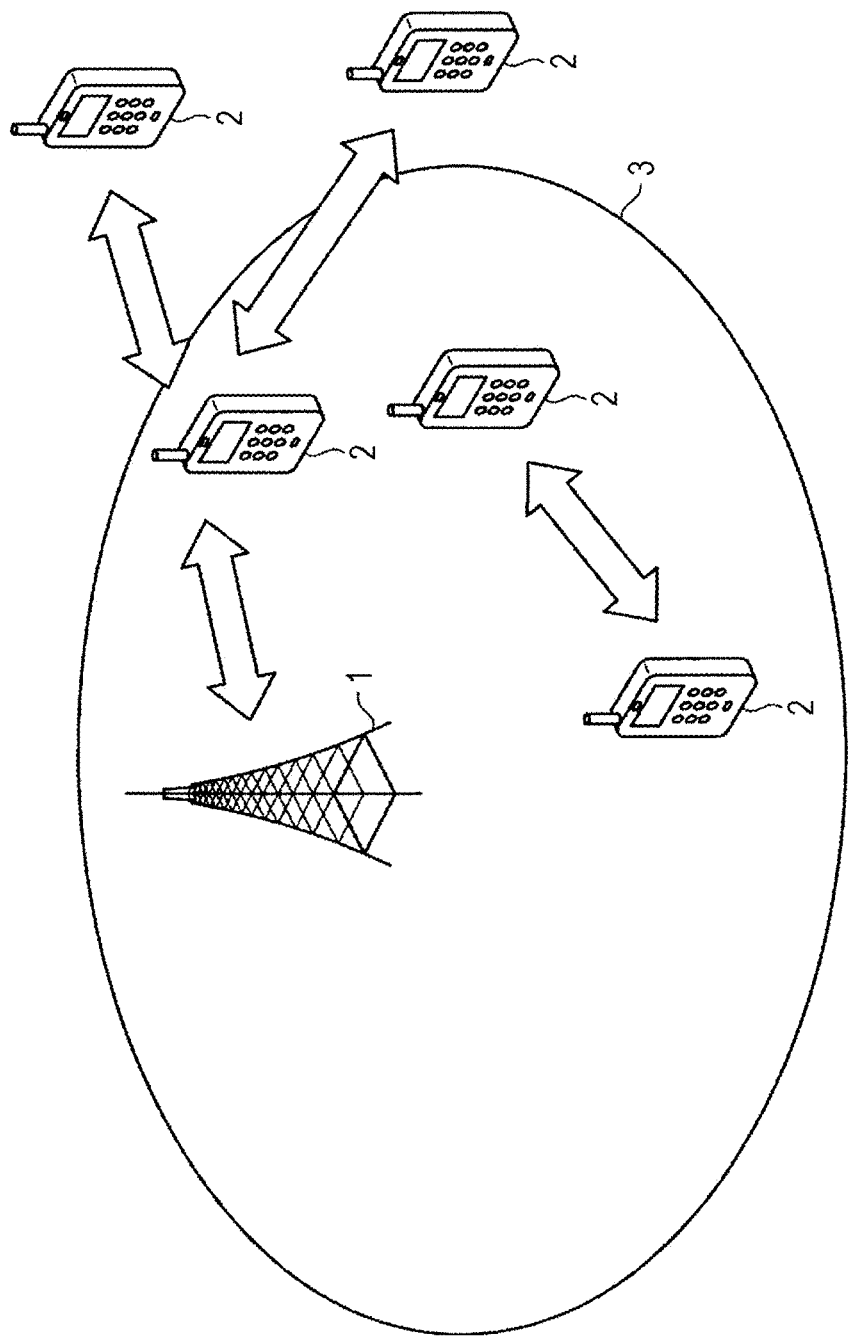
FIG. 1 is an explanatory diagram for describing an outline of sidelink communication according to an embodiment of the present disclosure.

Hereinafter, preferred embodiments of the present disclosure will be described in detail with reference to the accompanying drawings. Note that in the present specification and the drawings, components having substantially the same functional configuration will be denoted by the same reference numerals, and an overlapping description thereof will thus be omitted.

Note that a description will be given in the following order.

1. Introduction
2. Technical problem
3. Technical feature
4. Application example
4.1. Application example related to base station
4.2. Application example related to terminal device
5. End 1. Introduction Hereinafter, preferred embodiments of the present disclosure will be described in detail with reference to the accompanying drawings. Note that in the present specification and the drawings, components having substantially the same functional configuration will be denoted by the same reference numerals, and an overlapping description thereof will thus be omitted. Furthermore, unless otherwise stated, technologies, functions, methods, configurations, procedures, and all other descriptions described below can be applied to long term evolution (LTE) and new radio (NR).

<Wireless Communication System in Present Embodiment>

In the present embodiment, a wireless communication system includes at least a base station device 1 and a terminal device 2. The base station device 1 can accommodate a plurality of terminal devices. The base station device 1 can be connected to another base station device by means of an X2 interface. Furthermore, the base station device 1 can be connected to an evolved packet core (EPC) by means of an S1 interface. Moreover, the base station device 1 can be connected to a mobility management entity (MME) by the means of an S1-MME interface, and can be connected to a serving gateway (S-GW) by the means of an S1-U interface. The S1 interface supports a many-to-many connection between the MME and/or S-GW and base station device 1. Furthermore, in the present embodiment, the base station device 1 and the terminal device 2 support LTE and/or NR, respectively.

<Outline of Sidelink Communication in Present Embodiment>

FIG. 1 is an explanatory diagram for describing an outline of sidelink communication according to the present embodiment. As a certain use case, for example, there is a case where two or more terminal devices 2 exist inside a cell 3 configured by the base station device 1 and sidelink communication is performed between the terminal devices 2. Furthermore, as another use case, for example, there is a case where sidelink communication is performed between two or more terminal devices 2 in a situation where at least one of the two or more terminal devices 2 exists inside a cell 3 configured by the base station device 1 and the other terminal device 2 exists outside the cell 3. Moreover, the terminal device 2 existing inside the cell 3 can perform relay of communication between the base station device 1 and the terminal device 2 existing outside the cell 3 by performing communication with the base station device 1.

Note that it can be said that a state in which the terminal device 2 exists inside the cell 3 is a state in which a quality of a downlink signal received by the terminal device 2 from the base station device 1 is equal to or higher than a predetermined reference. Furthermore, it can be said that a state in which the terminal device 2 exists inside the cell 3 is a state in which a probability that a predetermined downlink channel received by the terminal device 2 from the base station device 1 can be decoded is equal to or higher than a predetermined probability. In other words, it can be said that a state in which the terminal device 2 exists outside the cell 3 is a state in which a quality of a downlink signal received by the terminal device 2 from the base station device 1 is below a predetermined reference. Furthermore, it can be said that a state in which the terminal device 2 exists outside the cell 3 is a state in which a probability that a predetermined downlink channel received by the terminal device 2 from the base station device 1 can be decoded is not equal to or higher than a predetermined probability.

Hereinafter, in the present embodiment, two terminal devices that perform transmission and reception by sidelink communication will also be referred to as a first terminal device and a second terminal device. In particular, in the present embodiment, a terminal device that receives information regarding sidelink communication from a base station device and transmits a sidelink control channel may be referred to as a first terminal device and the other terminal device may be referred to as a second terminal device.

<Configuration Example of Base Station Device in Present Embodiment>

Figure 2:
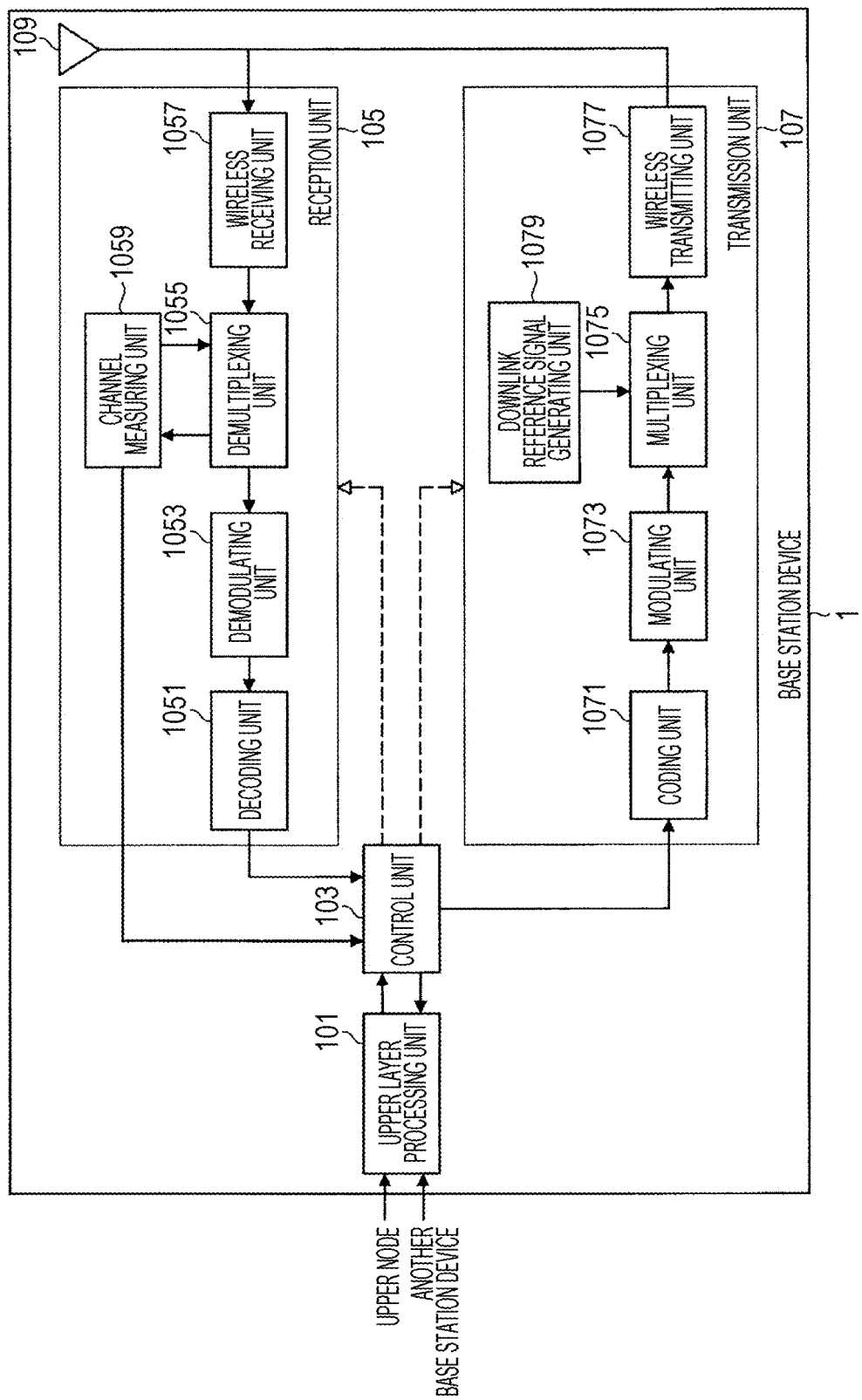
FIG. 2 is a schematic block diagram illustrating a configuration of a base station device according to the same embodiment.

FIG. 2 is a schematic block diagram illustrating a configuration of the base station device 1 according to the present embodiment. As illustrated in FIG. 2, the base station device 1 includes an upper layer processing unit 101, a control unit 103, a reception unit 105, a transmission unit 107, and a transmission/reception antenna 109. Furthermore, the reception unit 105 includes a decoding unit 1051, a demodulating unit 1053, a demultiplexing unit 1055, a wireless receiving unit 1057, and a channel measuring unit 1059. Furthermore, the transmission unit 107 includes a coding unit 1071, a modulating unit 1073, a multiplexing unit 1075, a wireless transmitting unit 1077, and a downlink reference signal generating unit 1079.

As described above, the base station device 1 can support one or more radio access technologies (RATs). Some or all of respective units included in the base station device 1 illustrated in FIG. 2 may be individually configured according to the RAT. For example, the reception unit 105 and the transmission unit 107 are individually configured in LTE and NR. Furthermore, in an NR cell, some or all of the respective units included in the base station device 1 illustrated in FIG. 2 may be individually configured according to a parameter set regarding a transmission signal. For example, in the NR cell, the wireless receiving unit 1057 and the wireless transmitting unit 1077 may be individually configured according to the parameter set regarding the transmission signal.

The upper layer processing unit 101 performs processing of a medium access control (MAC) layer, a packet data convergence protocol (PDCP) layer, a radio link control (RLC) layer, and a radio resource control (RRC) layer. Furthermore, the upper layer processing unit 101 generates control information for controlling the reception unit 105 and the transmission unit 107, and outputs the control information to the control unit 103.

The control unit 103 controls the reception unit 105 and the transmission unit 107 on the basis of the control information from the upper layer processing unit 101. The control unit 103 generates control information for the upper layer processing unit 101 and outputs the control information to the upper layer processing unit 101. The control unit 103 inputs a decoded signal from the decoding unit 1051 and a channel estimation result from the channel measuring unit 1059. The control unit 103 outputs a signal to be coded to the coding unit 1071. Furthermore, the control unit 103 is used to control the entirety or a part of the base station device 1.

The upper layer processing unit 101 performs processing and management regarding RAT control, radio resource control, a subframe setting, scheduling control, and/or channel state information (CSI) report control. The processing and the management in the upper layer processing unit 101 are performed for every terminal device or in common between terminal devices connected to the base station device. The processing and the management in the upper layer processing unit 101 may be performed only by the upper layer processing unit 101 or may be acquired from an upper node or another base station device. Furthermore, the processing and the management in the upper layer processing unit 101 may be individually performed according to the RAT. For example, the upper layer processing unit 101 individually performs processing and management in the LTE and processing and management in the NR.

In the RAT control in the upper layer processing unit 101, management regarding the RAT is performed. For example, in the RAT control, management regarding the LTE and/or management regarding the NR is performed. The management regarding the NR includes a setting and processing of a parameter set regarding a transmission signal in the NR cell.

In the radio resource control in the upper layer processing unit 101, generation and/or management of downlink data (transport block), system information, an RRC message (RRC parameter), and/or an MAC control element (CE) is performed.

In the subframe setting in the upper layer processing unit 101, management of a subframe setting, a subframe pattern setting, an uplink-downlink setting, an uplink reference UL-DL setting, and/or a downlink reference UL-DL setting is performed. Note that the subframe setting in the upper layer processing unit 101 is also referred to as a base station subframe setting. Furthermore, the subframe setting in the upper layer processing unit 101 can be determined on the basis of a traffic volume of an uplink and a traffic volume of a downlink. Furthermore, the subframe setting in the upper layer processing unit 101 can be determined on the basis of a scheduling result of the scheduling control in the upper layer processing unit 101.

In the scheduling control in the upper layer processing unit 101, a frequency and a subframe to which a physical channel is allocated, a coding rate and a modulation manner of the physical channel, a transmission power, and the like, are determined on the basis of received channel state information and an estimated value of a propagation path, a quality of a channel or the like input from channel measuring unit 1059. For example, the control unit 103 generates control information (downlink control information (DCI) format) on the basis of the scheduling result of the scheduling control in the upper layer processing unit 101.

In the CSI report control in the upper layer processing unit 101, a CSI report of the terminal device 2 is controlled. For example, a setting regarding a CSI reference resource to be assumed in order to calculate CSI in the terminal device 2 is controlled.

The reception unit 105 receives a signal transmitted from the terminal device 2 via the transmission/reception antenna 109 according to the control from the control unit 103, further performs reception processing such as demultiplexing, demodulation, decoding, and the like, and outputs information subjected to the reception processing to control unit 103. Note that the reception processing in the reception unit 105 is performed on the basis of a predefined setting or a setting of which the base station device 1 notifies the terminal device 2.

The wireless receiving unit 1057 performs conversion to an intermediate frequency (down-conversion), removal of an unnecessary frequency component, control of an amplification level so that a signal level is appropriately maintained, orthogonal demodulation based on in-phase and orthogonal components of the received signal, conversion from an analog signal to a digital signal, removal of a guard interval (GI), and/or extraction of a frequency domain signal by fast Fourier transform (FFT) on an uplink signal received via the transmission/reception antenna 109.

The demultiplexing unit 1055 demultiplexes an uplink channel such as a physical uplink control channel (PUCCH), a physical uplink shared channel (PUSCH) or the like and/or an uplink reference signal from the signal input from the wireless receiving unit 1057. The demultiplexing unit 1055 outputs the uplink reference signal to the channel measuring unit 1059. The demultiplexing unit 1055 performs compensation of the propagation path for the uplink channel from the estimated value of the propagation path input from the channel measuring unit 1059.

The demodulating unit 1053 performs demodulation of the received signal using a modulation manner such as binary phase shift keying (BPSK), quadrature phase shift keying (QPSK), 16-quadrature amplitude modulation (16QAM), 64QAM, 256QAM, or the like, for a modulation symbol of the uplink channel. The demodulating unit 1053 performs demultiplexing and modulation of a multiple-input multiple-output (MIMO)-multiplexed uplink channel.

The decoding unit 1051 performs decoding processing on coded bits of the demodulated uplink channel. The decoded uplink data and/or uplink control information is output to the control unit 103. The decoding unit 1051 performs decoding processing on the PUSCH for every transport block.

The channel measuring unit 1059 measures the estimated value of the propagation path, the quality of the channel or the like from the uplink reference signal input from the demultiplexing unit 1055, and outputs the estimated value of the propagation path, the quality of the channel or the like to the demultiplexing unit 1055 and/or the control unit 103. For example, the channel measuring unit 1059 measures the estimated value of the propagation path for performing compensation of the propagation path for the PUCCH or the PUSCH using an uplink demodulation reference signal (UL-DMRS), and measures the quality of the channel in the uplink using a sounding reference signal (SRS).

The transmission unit 107 performs transmission processing such as coding, modulation, multiplexing, and the like, on downlink control information and downlink data input from the upper layer processing unit 101 according to the control from the control unit 103. For example, the transmission unit 107 generates and multiplexes a physical hybrid automatic repeat request (HARQ) indicator channel (PHICH), a physical downlink control channel (PDCCH), an enhanced PDCCH (EPDCCH), a physical downlink shared channel (PDSCH), and a downlink reference signal to generate a transmission signal. Note that the transmission processing in the transmission unit 107 is performed on the basis of a predefined setting, a setting of which the base station device 1 notifies the terminal device 2, or a setting notification of which is provided through the PDCCH or the EPDCCH transmitted in the same subframe.

The coding unit 1071 performs coding using a predetermined coding manner such as block coding, convolutional coding, turbo coding, or the like, on an HARQ indicator (HARQ-ACK), the downlink control information, and the downlink data input from the control unit 103. The modulating unit 1073 modulates coded bits input from the coding unit 1071 in a predetermined modulation manner such as BPSK, QPSK, 16QAM, 64QAM, 256QAM, or the like. The downlink reference signal generating unit 1079 generates a downlink reference signal on the basis of a physical cell identifier (PCI), an RRC parameter set in the terminal device 2, and the like. The multiplexing unit 1075 multiplexes a modulation symbol of each channel and the downlink reference signal and arranges the multiplexed modulation symbol and downlink reference signal in a predetermined resource element.

The wireless transmitting unit 1077 performs processing such as conversion into a time domain signal by inverse fast Fourier transform (IFFT), addition of a guard interval, generation of a baseband digital signal, conversion to an analog signal, orthogonal modulation, conversion (up convert) from an intermediate frequency signal to a high frequency signal, removal of an extra frequency component, amplification of power, and the like, on the signal from the multiplexing unit 1075 to generate a transmission signal. The transmission signal output by the wireless transmitting unit 1077 is transmitted from the transmission/reception antenna 109.

<Configuration Example of Terminal Device in Present Embodiment>

Figure 3:
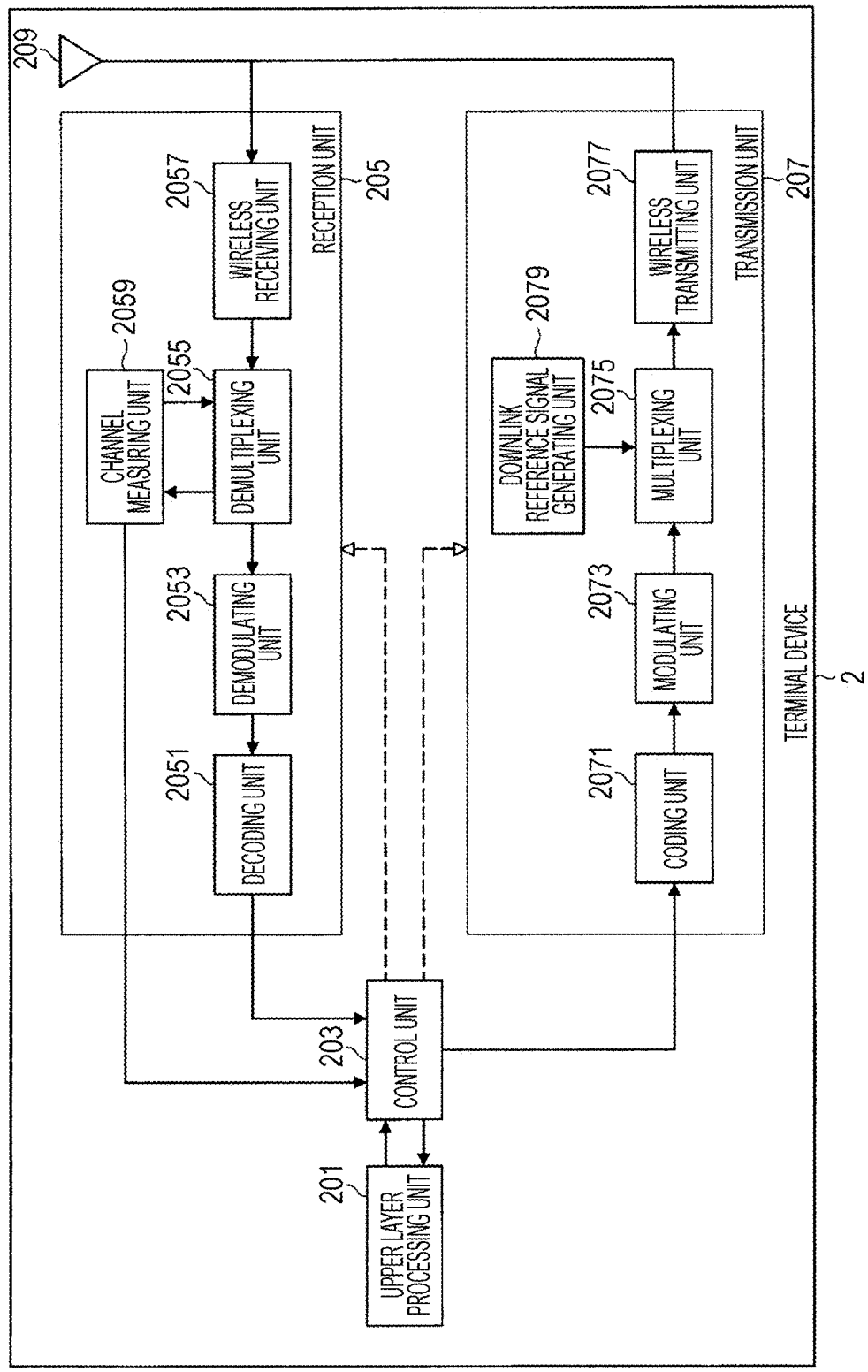
FIG. 3 is a schematic block diagram illustrating a configuration of a terminal device according to the same embodiment.

FIG. 3 is a schematic block diagram illustrating a configuration of the terminal device 2 according to the present embodiment. As illustrated in FIG. 3, the terminal device 2 includes an upper layer processing unit 201, a control unit 203, a reception unit 205, a transmission unit 207, and a transmission/reception antenna 209. Furthermore, the reception unit 205 includes a decoding unit 2051, a demodulating unit 2053, a demultiplexing unit 2055, a wireless receiving unit 2057, and a channel measuring unit 2059. Furthermore, the transmission unit 207 includes a coding unit 2071, a modulating unit 2073, a multiplexing unit 2075, a wireless transmitting unit 2077, and an uplink reference signal generating unit 2079.

As described above, the terminal device 2 can support one or more RATS. Some or all of respective units included in the terminal device 2 illustrated in FIG. 3 may be individually configured according to the RAT. For example, the reception unit 205 and the transmission unit 207 are individually configured in LTE and NR. Furthermore, in an NR cell, some or all of the respective units included in the terminal device 2 illustrated in FIG. 3 may be individually configured according to a parameter set regarding a transmission signal. For example, in the NR cell, the wireless receiving unit 2057 and the wireless transmitting unit 2077 may be individually configured according to the parameter set regarding the transmission signal.

The upper layer processing unit 201 outputs uplink data (transport block) to the control unit 203. The upper layer processing unit 201 performs processing of a medium access control (MAC) layer, a packet data convergence protocol (PDCP) layer, a radio link control (RLC) layer, and a radio resource control (RRC) layer. Furthermore, the upper layer processing unit 201 generates control information for controlling the reception unit 205 and the transmission unit 207, and outputs the control information to the control unit 203.

The control unit 203 controls the reception unit 205 and the transmission unit 207 on the basis of the control information from the upper layer processing unit 201. The control unit 203 generates control information for the upper layer processing unit 201 and outputs the control information to the upper layer processing unit 201. The control unit 203 inputs a decoded signal from the decoding unit 2051 and a channel estimation result from the channel measuring unit 2059. The control unit 203 outputs a signal to be coded to the coding unit 2071. Furthermore, the control unit 203 may be used to control the entirety or a part of the terminal device 2.

The upper layer processing unit 201 performs processing and management regarding RAT control, radio resource control, a subframe setting, scheduling control, and/or channel state information (CSI) report control. The processing and the management in the upper layer processing unit 201 are performed on the basis of a predefined setting and/or a setting based on control information set or provided in notification from the base station device 1. For example, the control information from the base station device 1 includes an RRC parameter, an MAC control element, or DCI. Furthermore, the processing and the management in the upper layer processing unit 201 may be individually performed according to the RAT. For example, the upper layer processing unit 201 individually performs processing and management in the LTE and processing and management in the NR.

In the RAT control in the upper layer processing unit 201, management regarding the RAT is performed. For example, in the RAT control, management regarding the LTE and/or management regarding the NR is performed. The management regarding the NR includes a setting and processing of a parameter set regarding a transmission signal in the NR cell.

In the radio resource control in the upper layer processing unit 201, management of setting information of the terminal device is performed. In the radio resource control in the upper layer processing unit 201, generation and/or management of uplink data (transport block), system information, an RRC message (RRC parameter), and/or an MAC control element (CE) is performed.

In the subframe setting in the upper layer processing unit 201, a subframe setting in the base station device 1 and/or a base station device different from the base station device 1 is managed. The subframe setting includes an uplink or downlink setting for a subframe, a subframe pattern setting, an uplink-downlink setting, an uplink reference UL-DL setting, and/or a downlink reference UL-DL setting. Note that the subframe setting in the upper layer processing unit 201 is also referred to as a terminal subframe setting.

In the scheduling control in the upper layer processing unit 201, control information for controlling scheduling for the reception unit 205 and the transmission unit 207 is generated on the basis of DCI (scheduling information) from the base station device 1.

In the CSI report control in the upper layer processing unit 201, control regarding a report of CSI to the base station device 1 is performed. For example, in the CSI report control, a setting regarding a CSI reference resource to be assumed in order to calculate CSI in the channel measuring unit 2059 is controlled. In the CSI report control, a resource (timing) used to report the CSI is controlled on the basis of the DCI and/or the RRC parameter.

The reception unit 205 receives a signal transmitted from the base station device 1 via the transmission/reception antenna 209 according to the control from the control unit 203, further performs reception processing such as demultiplexing, demodulation, decoding, and the like, and outputs information subjected to the reception processing to control unit 203. Note that the reception processing in the reception unit 205 is performed on the basis of a predefined setting or a notification or a setting from the base station device 1.

The wireless receiving unit 2057 performs conversion to an intermediate frequency (down-conversion), removal of an unnecessary frequency component, control of an amplification level so that a signal level is appropriately maintained, orthogonal demodulation based on in-phase and orthogonal components of the received signal, conversion from an analog signal to a digital signal, removal of a guard interval (GI), and/or extraction of a frequency domain signal by fast Fourier transform (FFT) on an uplink signal received via the transmission/reception antenna 209.

The demultiplexing unit 2055 demultiplexes a downlink channel such as a PHICH, a PDCCH, an EPDCCH, a PDSCH, or the like, a downlink synchronization signal, and/or a downlink reference signal from the signal input from the wireless receiving unit 2057. The demultiplexing unit 2055 outputs the downlink reference signal to the channel measuring unit 2059. The demultiplexing unit 2055 performs compensation of a propagation path for the downlink channel from an estimated value of a propagation path input from the channel measuring unit 2059.

The demodulating unit 2053 performs demodulation of the received signal using a modulation manner such as BPSK, QPSK, 16QAM, 64QAM, 256QAM, or the like, for a modulation symbol of the downlink channel. The demodulating unit 2053 performs demultiplexing and modulation of a multiple-input multiple-output (MIMO)-multiplexed downlink channel.

The decoding unit 2051 performs decoding processing on coded bits of the demodulated downlink channel. The decoded downlink data and/or downlink control information is output to the control unit 203. The decoding unit 2051 performs decoding processing on the PDSCH for every transport block.

The channel measuring unit 2059 measures the estimated value of the propagation path, a quality of a channel or the like from the downlink reference signal input from the demultiplexing unit 2055, and outputs the estimated value of the propagation path, the quality of the channel or the like to the demultiplexing unit 2055 and/or the control unit 203. The downlink reference signal that the channel measuring unit 2059 uses for measurement may be determined at least on the basis of a transmission mode set by the RRC parameter and/or other RRC parameters. For example, a DL-DMRS measures an estimated value of a propagation path for performing propagation path compensation for the PDSCH or the EPDCCH. A CRS measures an estimated value of the propagation path for performing propagation path compensation for the PDCCH or the PDSCH and/or a channel on the downlink for reporting the CSI. A CSI-RS measures the channel in the downlink for reporting the CSI. The channel measuring unit 2059 calculates a reference signal received power (RSRP) and/or a reference signal received quality (RSRQ) on the basis of the CRS, the CSI-RS, or a detection signal, and outputs the RSRP and the RSRQ to the upper layer processing unit 201.

The transmission unit 207 performs transmission processing such as coding, modulation, multiplexing, and the like, on uplink control information and uplink data input from the upper layer processing unit 201 according to the control from the control unit 203. For example, the transmission unit 207 generates and multiplexes an uplink channel such as a PUSCH, a PUCCH or the like, and/or an uplink reference signal to generate a transmission signal. Note that the transmission processing in the transmission unit 207 is performed on the basis of a predefined setting or a setting or a notification from the base station device 1.

The coding unit 2071 performs coding using a predetermined coding manner such as block coding, convolutional coding, turbo coding, or the like, on an HARQ indicator (HARQ-ACK), the uplink control information, and the uplink data input from the control unit 203. The modulating unit 2073 modulates coded bits input from the coding unit 2071 in a predetermined modulation manner such as BPSK, QPSK, 16QAM, 64QAM, 256QAM, or the like. The uplink reference signal generating unit 2079 generates an uplink reference signal on the basis of the RRC parameter and the like set in the terminal device 2. The multiplexing unit 2075 multiplexes a modulation symbol of each channel and the uplink reference signal and arranges the multiplexed modulation symbol and uplink reference signal in a predetermined resource element.

The wireless transmitting unit 2077 performs processing such as conversion into a time domain signal by inverse fast Fourier transform (IFFT), addition of a guard interval, generation of a baseband digital signal, conversion to an analog signal, orthogonal modulation, conversion (up convert) from an intermediate frequency signal to a high frequency signal, removal of an extra frequency component, amplification of power, and the like, on the signal from the multiplexing unit 2075 to generate a transmission signal. The transmission signal output by the wireless transmitting unit 2077 is transmitted from the transmission/reception antenna 209.

<Details of Sidelink of LTE in Present Embodiment>

In LTE, sidelink communication is performed. The sidelink communication is direct communication between a terminal device and a terminal device different from the terminal device. In a sidelink, candidates for time and frequency resources used for transmission and reception of the sidelink, called a resource pool are set in the terminal device, resources for transmission and reception of the sidelink are selected from the resource pool, and the sidelink communication is performed. Since the sidelink communication is performed using an uplink resource (uplink subframe or uplink component carrier), the resource pool is also set to the uplink subframe or the uplink component carrier.

A sidelink physical channel includes a physical sidelink control channel (PSCCH), a physical sidelink shared channel (PSSCH), a sidelink acknowledgement (ACK)/negative ACK (NACK) channel, and the like.

The PSCCH is used to transmit sidelink control information (SCI). Mapping of information bits of the sidelink control information is defined as an SCI format. The sidelink control information includes a sidelink grant. The sidelink grant is used for scheduling of the PSSCH.

The PSSCH is used to transmit sidelink data (sidelink shared channel (SLL-SCH)). Note that the PSSCH may also be used to transmit control information of an upper layer.

The sidelink ACK/NACK channel is used to answer an ACK/NACK to a decoding result of the PSSCH to a transmission terminal device.

The resource pool is set from the base station device to the terminal device by a system information block (SIB) or a dedicated RRC message. Alternatively, the resource pool is set by information regarding the resource pool preset in the terminal device. A time resource pool is indicated by cycle information, offset information, and subframe bitmap information. A frequency resource pool is indicated by a start position of a resource block, an end position of the resource block, and the number of consecutive resource blocks.

<Details of Sidelink of NR in Present Embodiment>

Hereinafter, details of allocation of a resource pool of a sidelink in NR will be described.

In sidelink communication in a cell coverage, the resource pool of the sidelink in the NR can be dynamically set. The resource pool of the sidelink in the NR is indicated from a base station by an NR-PDCCH. That is, NR-DCI included in the NR-PDCCH indicates a resource block and a subframe in which an NR-PSCCH, an NR-PSSCH, and a sidelink ACK/NACK channel are transmitted and received.

Figure 4:
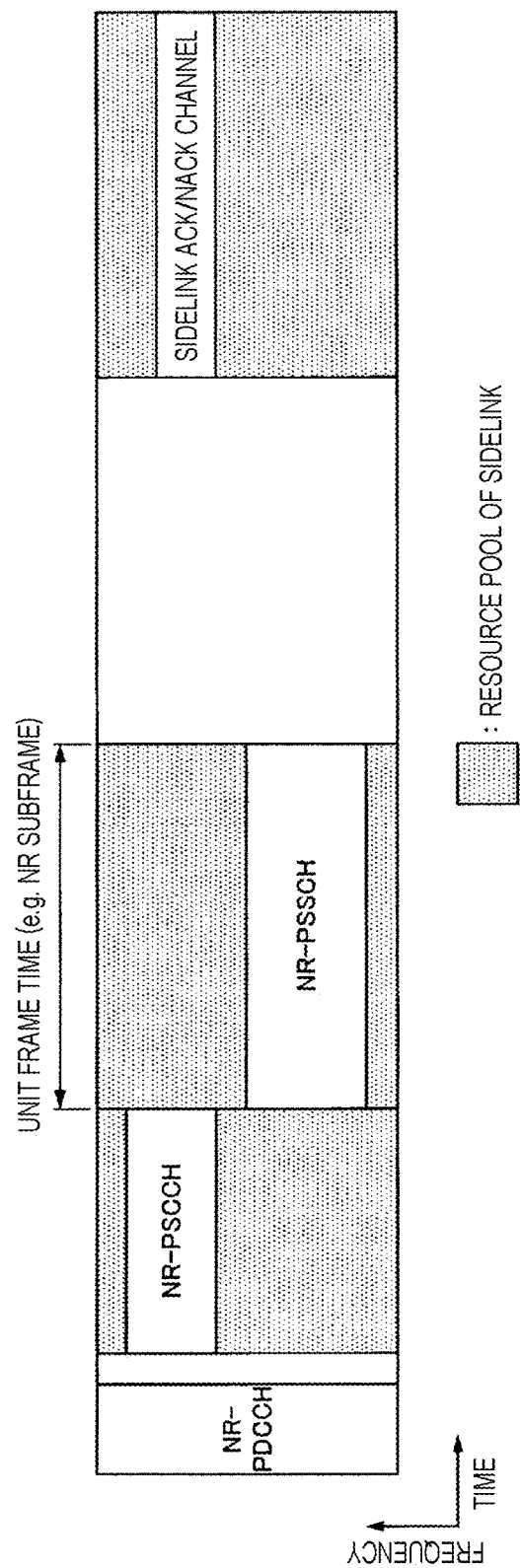
FIG. 4 is an explanatory diagram for describing an example of dynamic resource pool allocation of a sidelink.

FIG. 4 is a diagram illustrating an example of dynamic resource pool allocation of a sidelink. The first terminal device sets three subframes including and following a subframe in which an NR-PDCCH is transmitted, as a resource pool for sidelink communication, by the NR-PDCCH. The first terminal device waits for a gap time for reception/transmission switching and generation processing of an NR-PSCCH and an NR-PSSCH, and then transmits the NR-PSCCH to the second terminal device using the resource pool designated by the NR-PDCCH. Moreover, the first terminal device transmits an NR-PSSCH scheduled according to an NR-SCI format included in the NR-PSCCH to the second terminal device using the resource pool designated in the NR-PDCCH. Finally, the second terminal device waits for a gap time for generation processing of a sidelink ACK/NACK channel, and then transmits information of an ACK/NACK response to the NR-PSSCH transmitted from the first terminal device to the first terminal device on the sidelink ACK/NACK channel, using the resource pool designated by the NR-PDCCH.

As an example of indication of a time resource pool by the NR-PDCCH, a time resource used for the sidelink communication is indicated as a resource pool of a sidelink from the NR-PDCCH to a predetermined subframe in a case where DCI indicating the sidelink communication has been included in the NR-PDCCH. The first terminal device recognizes the time resource pool from a subframe in which the DCI indicating the sidelink communication has been received. A predetermined subframe may be preset to, for example, three subframes or the like or may be set from an upper layer such as an SIB, a dedicated RRC message or the like.

As an example of indication of a time resource pool by the NR-PDCCH, information indicating a subframe is included in DCI included in the NR-PDCCH and indicating the sidelink communication, and a resource pool of a time resource used for the sidelink communication is indicated on the basis of the information. The first terminal device recognizes the time resource pool from the information indicating the subframe. As a method of indicating the subframe, for example, there are a subframe number, the number of subframes from the NR-PDCCH to the time resource pool, and the like.

As an example of indication of a frequency resource by the NR-PDCCH, a frequency resource used for the sidelink communication is indicated on the basis of resource allocation information, which is one of parameters of the DCI included in the NR-PDCCH and indicating the sidelink communication. The first terminal device recognizes that a resource block indicated by the resource allocation information is a resource pool. The resource allocation information is information indicating at least a resource in which the NR-PSCCH is transmitted.

Note that notification of the resource allocation information may be individually provided by information indicating a resource in which the NR-PSCCH is transmitted, information indicating a resource in which the NR-PSSCH is transmitted, and information indicating a resource in which the sidelink ACK/NACK channel is transmitted.

Note that the resource in which the NR-PSSCH is transmitted and the resource in which the sidelink ACK/NACK channel is transmitted may be linked to the information indicating the resource in which the NR-PSCCH is transmitted. For example, a frequency resource in which the NR-PSSCH is transmitted may be the same as a frequency resource in which the NR-PSCCH is transmitted. For example, the resource in which the sidelink ACK/NACK channel is transmitted and the frequency resource in which the NR-PSSCH is transmitted may be the same as the frequency resource in which the NR-PSCCH is transmitted.

Note that resource pools of a plurality of NR component carriers may be indicated by one NR-PDCCH. For example, a resource pool used for sidelink communication between a primary cell and a secondary cell of the NR may be set from an NR-PDCCH transmitted in the primary cell of the NR.

Note that a subframe and a resource block in which the resource pool can be indicated by the NR-PDCCH may be limited by upper layer information. The upper layer information is, for example, terminal-unique setting information such as a dedicated RRC message or the like or notification information such as an SIB or the like. Candidates for time and frequency resource pools are set by the upper layer information, and a subframe and a resource block that can actually be used as the resource pool are indicated from the candidates by the DCI included in the NR-PDCCH and indicating the sidelink communication.

It is preferable that the NR-PDCCH including information regarding the resource pool of the sidelink is transmitted uniquely to a terminal device or uniquely to a terminal device group. That is, it is preferable that the NR-PDCCH including resource pool information of the sidelink is arranged in a search space determined by terminal device-unique information such as a cell radio network temporary identify (C-RNTI) or the like or is arranged in a search space determined by terminal device group-unique information.

As an example of monitoring of the NR-PSCCH of the second terminal device, the second terminal device always monitors both the NR-PDCCH and the NR-PSCCH. The second terminal device shifts to uplink transmission processing, downlink reception processing, or NR-PSCCH transmission processing in a case where the second terminal device has detected an NR-PDCCH addressed to the second terminal device, and attempts monitoring of the NR-PSCCH otherwise. In this case, for the second terminal device, a plurality of resource candidates (NR-PSCCH candidates) in which there is a possibility that the NR-PSCCH will be transmitted is set from an upper layer or is preset. The second terminal device attempts blind decoding of the NR-PSCCH in the set NR-PSCCH candidates. Notification of setting information of the NR-PSCCH candidate is provided to the second terminal device by a dedicated RRC message in a case where the second terminal device is in an RRC connection state with the base station device, and is provided to the second terminal device by a sidelink notice channel (NR-PSBCH) of the NR transmitted by the first terminal device in a case where the second terminal device is not in the RRC connection state with the base station device. Setting information included in the NR-PSBCH is information set from the base station device in a case where the first terminal device exists inside the cell, and is preset information in a case where the first terminal device exists outside the cell.

Note that the resource pool in which the NR-PSBCH is transmitted may also be indicated by the NR-PDCCH. A method of indicating the resource pool in which the NR-PSBCH is transmitted may be similar to a method of indicating the resource pool in which the NR-PSCCH is transmitted.

As another example of monitoring of the NR-PSCCH of the second terminal device, in a case where the second terminal device is inside the cell, the second terminal device can receive an NR-PDCCH in which the resource pool is designated. The second terminal device attempts decoding of the NR-PSCCH in the resource in which the NR-PSCCH is transmitted, on the basis of information of the resource pool included in the NR-PDCCH in a case where the second terminal device has received the NR-PDCCH, and waits for processing of monitoring until the next unit frame otherwise. Therefore, an operation of attempting the decoding of the NR-PSCCH plural times in one unit frame may not be performed, and an effect such as low power consumption, simplification of a receiver, or the like, of the terminal device can thus be expected.

Figure 5:
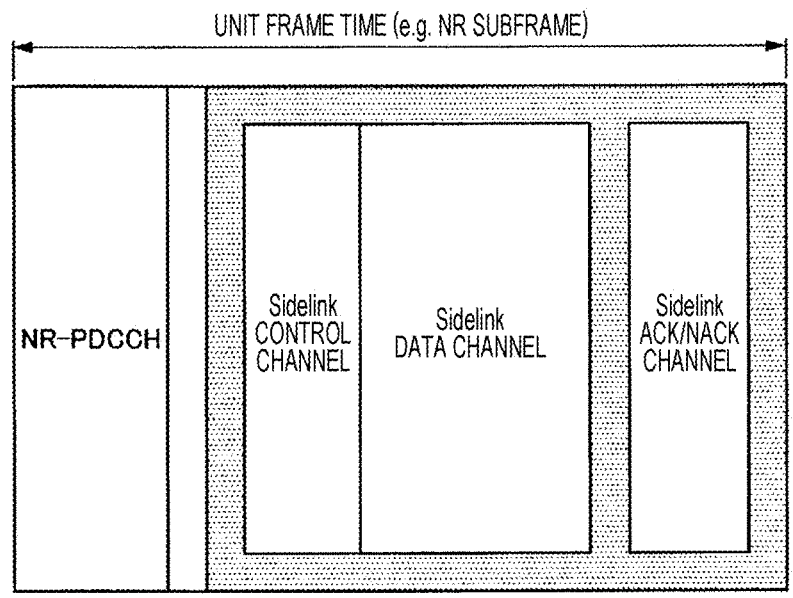
FIG. 5 is an explanatory diagram for describing another example of dynamic resource pool allocation of a sidelink.

FIG. 5 is a diagram illustrating an example of dynamic resource pool allocation of a sidelink. As a difference from FIG. 4, in a case where self-completion type transmission is possible even in sidelink communication, transmission and reception of an NR-PSCCH, an NR-PSSCH, and a sidelink ACK/NACK channels can be completed in a resource pool for sidelink transmission allocated within one predetermined transmission and reception time (for example, a unit frame time), as illustrated in FIG. 5. The first terminal device recognizes the resource pool of the sidelink on the basis of DCI (DCI for a first sidelink) included in the NR-PDCCH and indicating the sidelink communication after receiving the NR-PDCCH. Then, the first terminal device transmits the NR-PSCCH and the NR-PSSCH using the resource pool of the sidelink indicated from the DCI for a first sidelink. The second terminal device attempts decoding of the NR-PSSCH on the basis of information included in the NR-PSCCH after receiving the NR-PSCCH transmitted from the first terminal device.

The first terminal device can determine a channel length of the NR-PSSCH on the basis of information regarding a time resource of the sidelink included in the DCI for a first sidelink. Alternatively, the first terminal device can recognize a time resource of the sidelink included in the NR-PDCCH on the basis of information regarding a channel length of the NR-PSSCH included in the DCI for a first sidelink.

Therefore, the self-completion type transmission becomes possible even in the sidelink communication, and by performing flexible resource control, resource utilization efficiency of a system becomes good.

Figure 6:
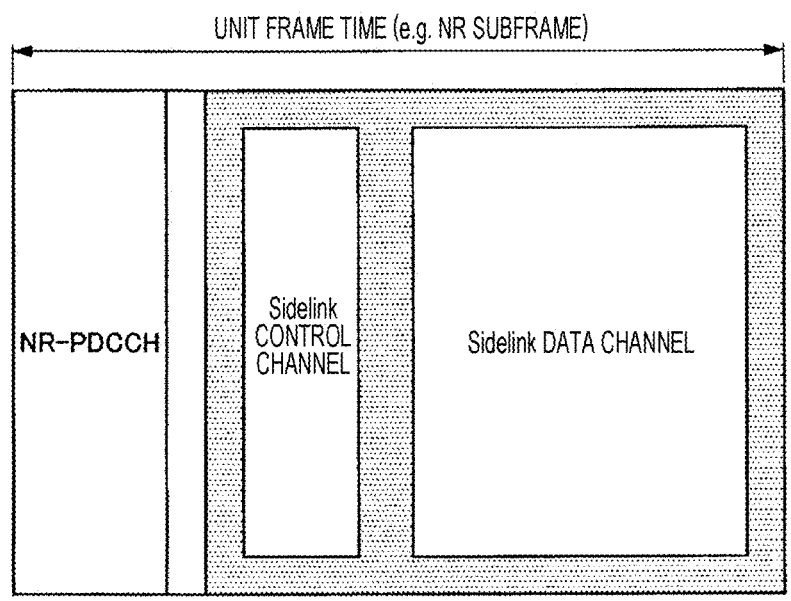
FIG. 6 is an explanatory diagram for describing another example of dynamic resource pool allocation of a sidelink.

FIG. 6 is a diagram illustrating an example of dynamic resource pool allocation of a sidelink. As a difference from FIG. 5, the first terminal device indicates scheduling information of NR-PSSCH transmission from the second terminal device for the second terminal device using an NR-PSCCH. The second terminal waits for a gap time for reception processing of the NR-PSCCH and transmission processing of an NR-PSSCH, and then transmits the NR-PSSCH on the basis of information indicated from the NR-PSSCH. Therefore, in particular, even in a case where the second terminal device exists outside the cell, the base station device can dynamically control the resource for sidelink communication used by the second terminal device via the first terminal device, such that resource utilization efficiency of the system becomes good.

DCI (DCI for a second sidelink) included in the NR-PSCCH transmitted in FIG. 6 and indicating sidelink communication is different from the DCI for a first sidelink included in the NR-PSCCH transmitted in FIG. 5 and indicating the sidelink communication. The DCI included in the NR-PSCCH transmitted in FIG. 5 and indicating the sidelink communication is DCI for scheduling resources for the first terminal device to transmit the NR-PSCCH and the NR-PSSCH to the second terminal device, and the DCI included in the NR-PSCCH transmitted in FIG. 6 and indicating the sidelink communication is DCI for scheduling a resource for the first terminal device to transmit the NR-PSCCH to the second terminal device and a resource for the second terminal device to transmit the NR-PSSCH scheduled by the NR-PSCCH to the first terminal device.

Furthermore, SCI (first SCI) included in the NR-PSCCH transmitted in FIG. 5 and SCI (second SCI) included in the NR-PSCCH transmitted in FIG. 6 are different from each other. The first SCI is used to instruct the second terminal device to receive the NR-PSSCH transmitted from the first terminal device, and the second SCI is used to instruct the second terminal device to transmit the NR-PSSCH to the first terminal device.

Figure 7:
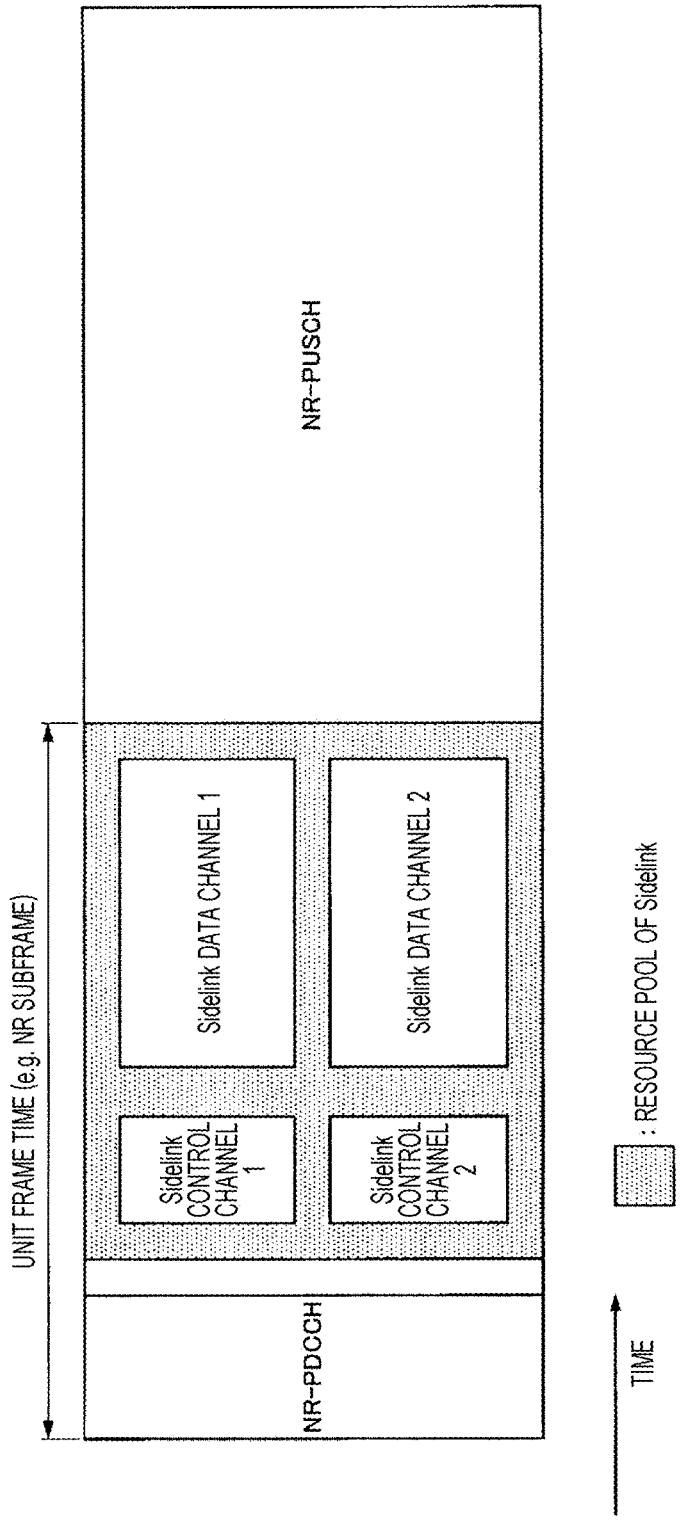
FIG. 7 is an explanatory diagram for describing another example of dynamic resource pool allocation of a sidelink.

FIG. 7 is a diagram illustrating an example of dynamic resource pool allocation of a sidelink. In FIG. 7, terminal device relay is assumed. In FIG. 7, further from FIG. 6, scheduling of an NR-PUSCH in addition to indication of the resource pool of a sidelink is performed by an NR-PDCCH. Similar to FIG. 6, the first terminal device instructs the second terminal device to transmit an NR-PSSCH by an NR-PSCCH, and receives an SL-SCH from the second terminal device. Then, the first terminal device includes the received SL-SCH in the NR-PUSCH and transmits the NR-PUSCH to the base station device. Therefore, a resource pool of the sidelink and the NR-PUSCH can be scheduled by one NR-PDCCH, and it is thus possible to realize low-delay terminal device relay while reducing an overhead due to the NR-PDCCH.

Figure 8:
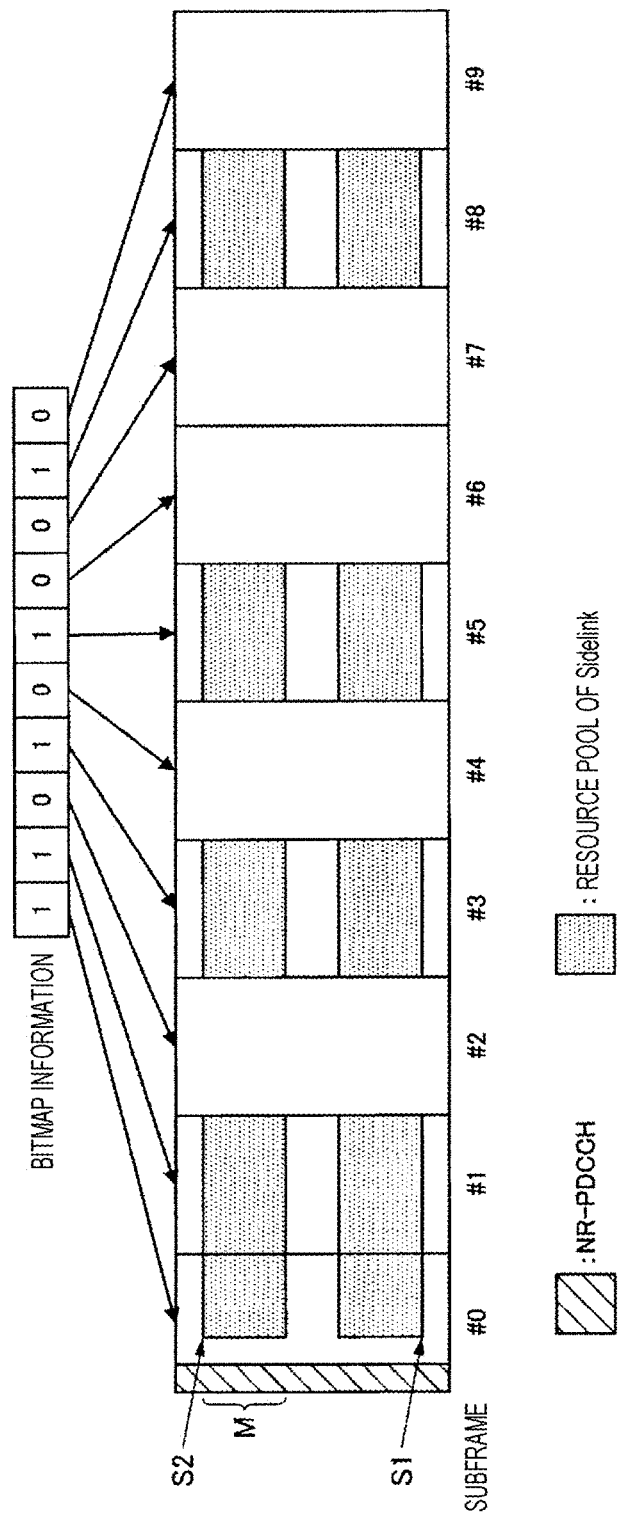
FIG. 8 is an explanatory diagram for describing another example of dynamic resource pool allocation of a sidelink.

FIG. 8 is a diagram illustrating an example of dynamic resource pool allocation of a sidelink. In FIG. 8, a resource pool of a sidelink is indicated on a radio frame basis by an NR-PDCCH. Transmission is performed in subframe #0.

Resource pool information of the sidelink included in the NR-PDCCH is indicated by bitmap information in which a subframe in which the resource pool of the sidelink is set is indicated by 1 or 0, a start position S1 of a resource block, an end position S2 of the resource block, and the number M of consecutive resource blocks.

It is preferable that the NR-PDCCH including the resource pool information of the sidelink is sent to a terminal share. That is, it is preferable that the NR-PDCCH including the resource pool information of the sidelink is arranged in a search space common between terminal devices.

In a case where the terminal device has received the NR-PDCCH including the resource pool information of the sidelink in subframe #0, the resource pool is set using the resource pool information between the radio frames that have received the NR-PDCCH. On the other hand, in a case where the terminal device has received the NR-PDCCH including the resource pool information of the sidelink in subframe #0, it is assumed that the resource pool is not set between the radio frames.

2. Technical Problem

Next, a technical problem of the communication system according to the embodiment of the present disclosure will be described with particular attention to a case where V2X (particularly V2V) is realized using sidelink communication of NR.

As described above, in the NR, in addition to support of a V2X use case of the LTE, it has been required to support use cases with higher requirements, such as vehicles platooning, extended sensors, advanced driving, remote driving, or the like. In order to support these use cases, a higher throughput, lower latency, and higher reliability have been required, such that an operation in a millimeter wave such as a 60 GHz band or the like has also been studied. Meanwhile, the millimeter wave has significant radio wave attenuation, such that communication using the millimeter wave may require a technology called beamforming.

Figure 9:
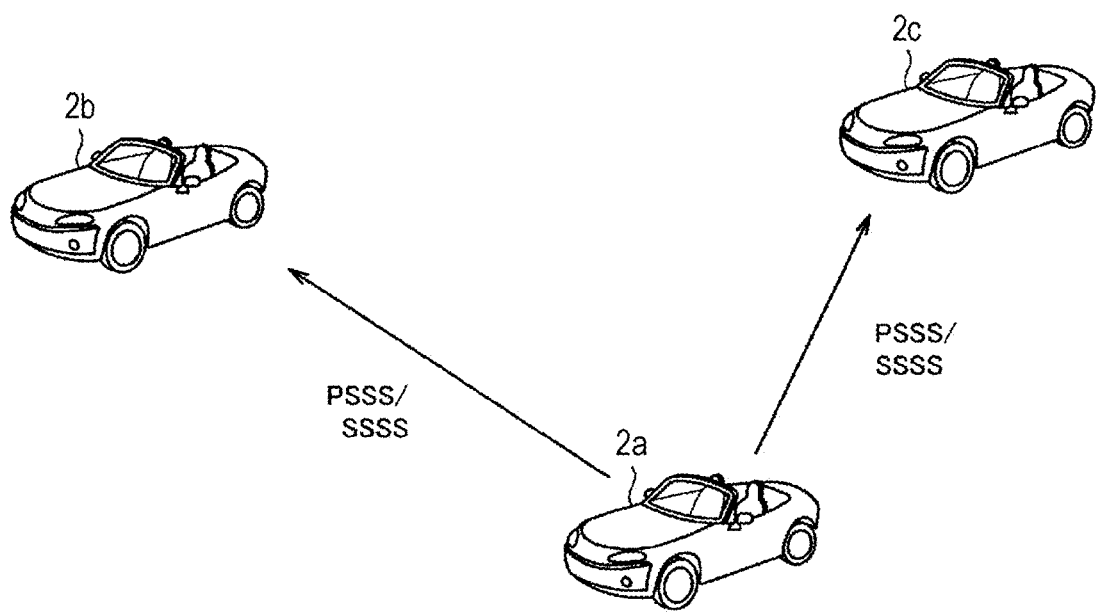
FIG. 9 is an explanatory diagram for describing an outline of device-to-device (D2D).

Furthermore, in device-to-device (D2D), synchronization signals (primary sidelink synchronization signal (PSSS)/secondary sidelink synchronization signal (SSSS) and PSBCH) are broadcast from a predetermined terminal as a synchronization method of communication between terminals outside a coverage. For example, FIG. 9 is an explanatory diagram for describing an outline of D2D, and illustrates an example of a synchronization method of communication between terminals outside a coverage. In the example illustrated in FIG. 9, a terminal device 2a located in the coverage broadcasts synchronization signals (PSSS/SSSS) to other terminal devices 2b and 2c located in the vicinity of the terminal device 2a. Therefore, for example, even though the terminal devices 2b and 2c are located outside the coverage, the terminal devices 2b and 2c can recognize links of the D2D communication by receiving the synchronization signals broadcast from the terminal device 2a. That is, even in a situation where some of the terminal devices 2 are located outside the coverage, an operation of the D2D including some of the terminal devices 2 by the configuration as described above becomes possible.

Moreover, as described above, in the V2V communication of the NR, a high throughput is required, such that introduction of unicast communication is expected. Advantages of the unicast communication over broadcast communication are as follows:

Retransmission processing such as HARQ is easy.

Processing of closed loop control (link adaptation, transmission power control, beam adaptation, and the like) can be applied.

Meanwhile, as described above, in the NR, by forming a beam with improved directivity by narrowing a radio signal by the beamforming, it becomes possible to communicate with a terminal device located farther away even in a case where the millimeter wave having the significant radio wave attenuation was used. Meanwhile, under such a situation, when starting the V2V communication, adjustment of a transmission beam and a reception beam as well as synchronization is required between the terminal devices.

Figure 10:
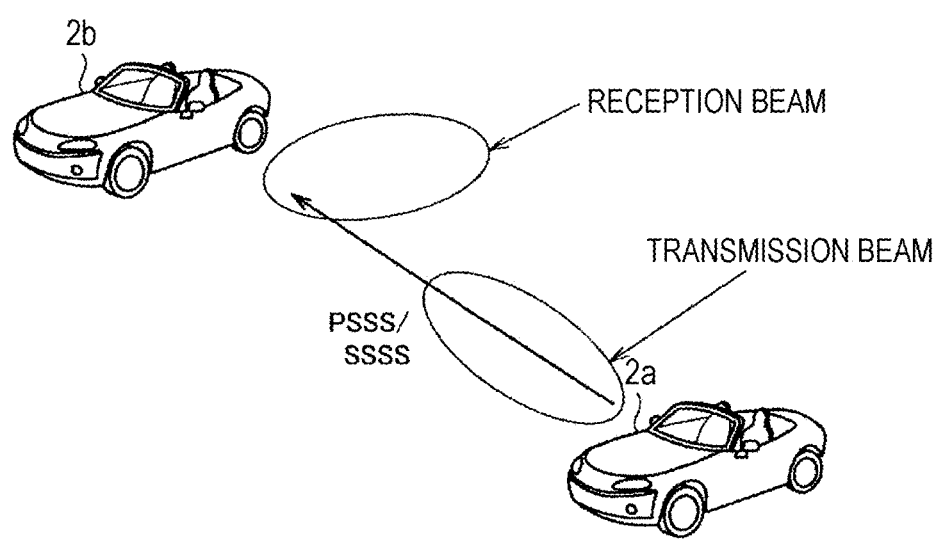
FIG. 10 is an explanatory diagram for describing an outline of vehicle-to-vehicle (V2V) communication of new radio (NR).

For example, FIG. 10 is an explanatory diagram for describing an outline of the V2V communication of the NR, and illustrates an example of a situation in which adjustment of a transmission beam and a reception beam is required. For example, in the example illustrated in FIG. 10, a terminal device 2a located in a coverage broadcasts a synchronization signal (PSSS/SSSS) to another terminal device 2b located in the vicinity of the terminal device 2a. At this time, in the V2V communication of the NR, a transmission beam formed by the terminal device 2a and a reception beam formed by the terminal device 2b need to be appropriately determined according to a positional relationship between the terminal device 2a and the terminal device 2b. In a conventional beam connection setup between a downlink and an uplink, a beam of the downlink is first aligned, and a beam of the uplink corresponding to the downlink is then selected. However, in sidelink communication applied to the V2V communication, a concept of the uplink and the downlink does not exist. Therefore, it becomes necessary to define which vehicle (terminal device) performs a beam connection to which vehicle (terminal device).

Furthermore, in the V2V communication of the NR, there may be a restriction called a so-called half duplex (HD) that transmission and reception are limited to be performed in a time division manner, such that the transmission or the reception cannot be always performed. By applying such an HD restriction, for example, it becomes difficult for a vehicle (terminal device) that is performing the transmission to perform the reception at the same time. That is, due to the HD limitation, it becomes difficult for a vehicle that is transmitting a signal for beam connection to receive a signal from another vehicle.

Figure 11:
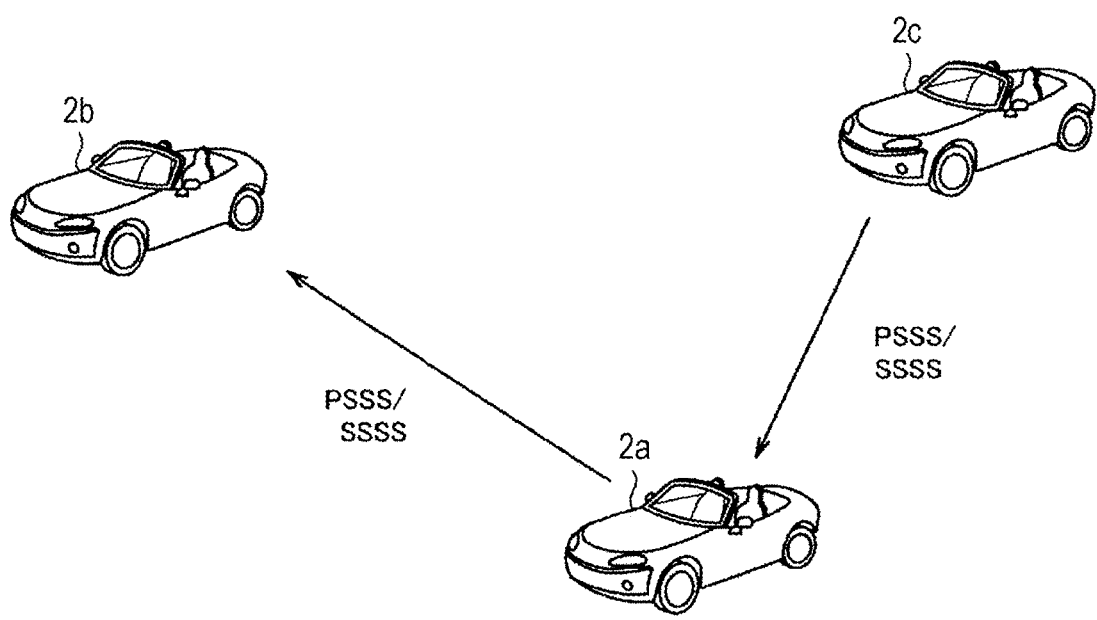
FIG. 11 is an explanatory diagram for describing an outline of a half duplex (HD) restriction.

For example, FIG. 11 is an explanatory diagram for describing an outline of the HD limitation. In an example illustrated in FIG. 11, a terminal device 2a (vehicle) is transmitting a signal (for example, PSSS/SSSS) to a terminal device 2b (vehicle). At this timing, even though a signal (for example, PSSS/SSSS) was being transmitted from a terminal device 2c located in the vicinity of the terminal device 2a, it becomes difficult for the terminal device 2a to receive the signal transmitted from the terminal device 2c due to the HD limitation.

Furthermore, in a case where unicast communication is applied, it is necessary to consider synchronization for establishing the unicast communication. Specifically, in the unicast communication, improve of resource efficiency can be expected by performing resource allocation to a plurality of terminal devices by frequency division multiplexing (FDM) or space division multiplexing (SDM). On the other hand, in order to realize the resource allocation by the FDM or the SDM, it can be necessary to align timing between a transmission symbol and a reception symbol between the terminal devices.

In view of the circumstance as described above, the present disclosure proposes a technology capable of realizing establishment of inter-device communication (for example, V2X communication typified by V2V) between terminal devices in which application of NR is assumed, in a more suitable manner. Specifically, the present disclosure proposes a technology capable of more rapidly establishing inter-device communication between terminal devices with beam connection under an HD restriction.

3. Technical Feature

Hereinafter, a technical feature of the system according to the embodiment of the present disclosure will be described.

Figure 12:
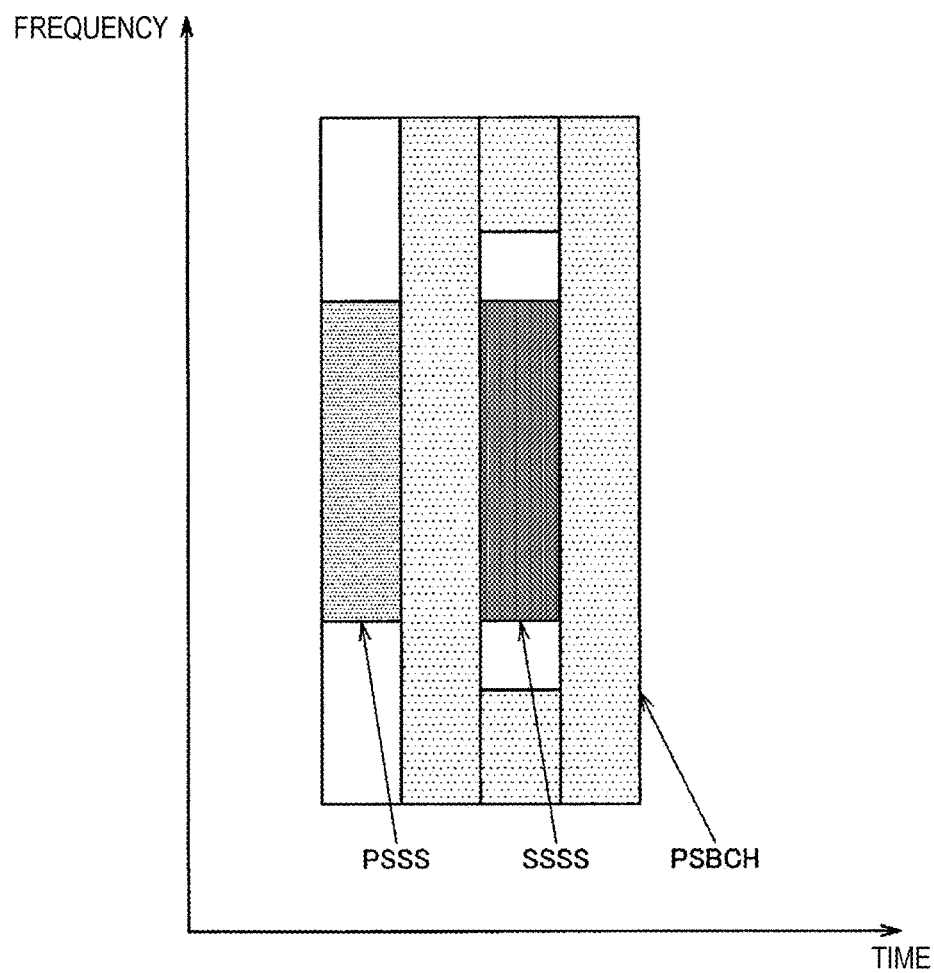
FIG. 12 is an explanatory diagram for describing an example of a configuration of a sidelink synchronization signal (SLSS) block.

In the system according to the embodiment of the present disclosure, a plurality of sidelink synchronization signal (SLSS) blocks is transmitted. The SLSS block includes, for example, primary sidelink synchronization signal (PSSS)/ secondary sidelink synchronization signal (SSSS)/PSBCH, synchronization signal+broadcast information, and the like. One SLSS is transmitted using a predetermined transmission beam. A different transmission beam is applied to each SLSS block. In other words, the SLSS blocks (in other words, synchronization signals) are associated with each of a plurality of beams allocated to be available for inter-device communication between a plurality of terminal devices 2 different from each other. An index is associated with each SLSS block. It becomes possible to identify the transmission beam by the index associated with the SLSS block. For example, FIG. 12 is an explanatory diagram for describing an example of a configuration of an SLSS block. In the example illustrated in FIG. 12, a PSSS, an SSSS, and a PSBCH are allocated to regions (for example, regions in a time direction and a frequency direction) to which resources of wireless communication are allocated. Of course, the example illustrated in FIG. 12 is mere an example, and the regions to which resources are allocated may be appropriately changed according to a communication manner of wireless communication.

The plurality of SLSS blocks described above is transmitted from the terminal device 2 to another terminal device 2. As a specific example, the terminal device 2a transmits the plurality of SLSS blocks. Another terminal device 2b performs synchronization and beam adjustment between another terminal device 2b and the terminal device 2a using an SLSS block having the highest reference signal received power (RSRP) among the SLSS blocks received from the terminal device 2a.

<Arrangement Example of SLSS Blocks>

Figure 13:
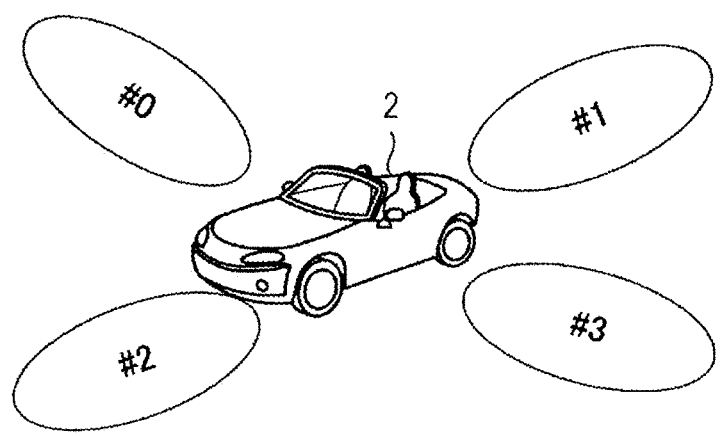
FIG. 13 is an explanatory diagram for describing an outline of an example of an arrangement of the SLSS blocks.

Here, an example of arranging the SLSS blocks with respect to the regions to which the resources of the wireless communication are allocated will be described with reference to FIGS. 13 to 17. For example, FIG. 13 is an explanatory diagram for describing an outline of an example of an arrangement of the SLSS blocks, and illustrates an example of beams associated with the SLSS blocks. That is, in the present description, for convenience, it is assumed that the terminal device 2 forms four beams (that is, beams #0 to #3) in different directions, as illustrated in FIG. 13. Note that the number of beams that the terminal device of the present embodiment has is not limited to four, and the present disclosure can be similarly applied to all of a plurality of beams.

Arrangement Pattern 1 (Localized Manner) of SLSS Blocks

Figure 14:
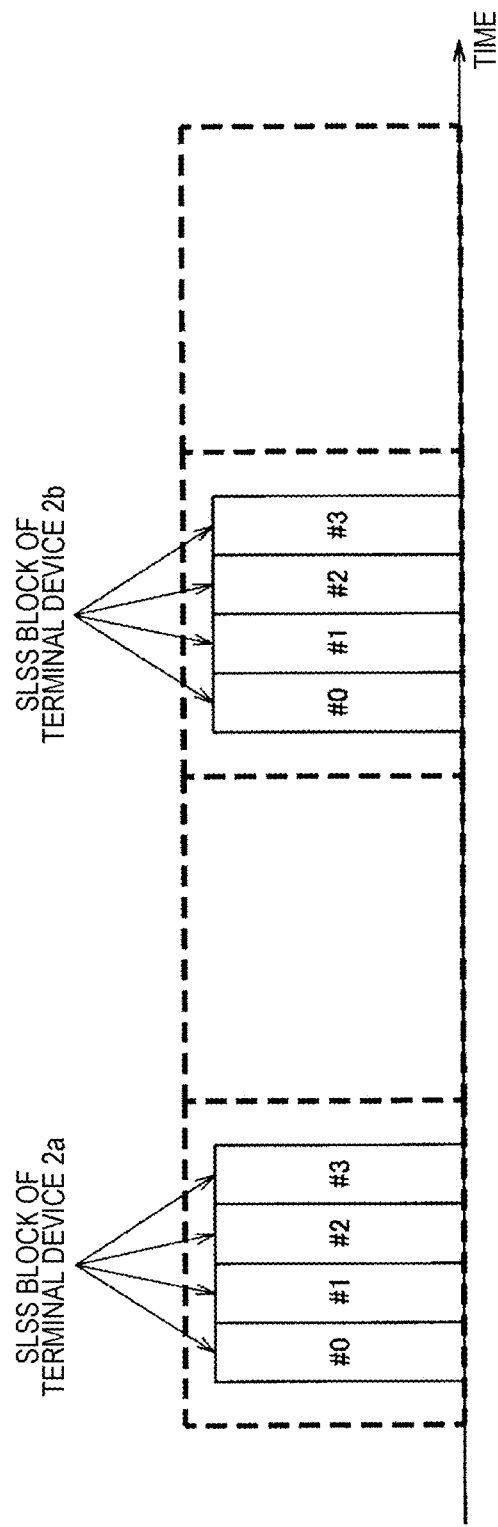
FIG. 14 is an explanatory diagram for describing an example of an arrangement pattern of the SLSS blocks.

Next, an example of an arrangement pattern of the SLSS blocks will be described. For example, FIG. 14 is an explanatory diagram for describing an example of an arrangement pattern of the SLSS blocks. Specifically, FIG. 14 illustrates an example of a pattern related to an arrangement of the SLSS blocks in a case where the SLSS blocks are arranged in a time direction. In FIG. 14, a horizontal axis represents a time.

In the example illustrated in FIG. 14, an arrangement of SLSS blocks for every terminal device 2 is patterned so that the SLSS blocks for every terminal device 2 are continuously transmitted in a predetermined section (for example, in a slot, in a half frame, or in a radio frame). With such a configuration, in the example illustrated in FIG. 14, it becomes possible to shorten a search time of the SLSS blocks for every terminal device 2.

Arrangement Pattern 2 (Distributed Manner) of SLSS Blocks

Figure 15:
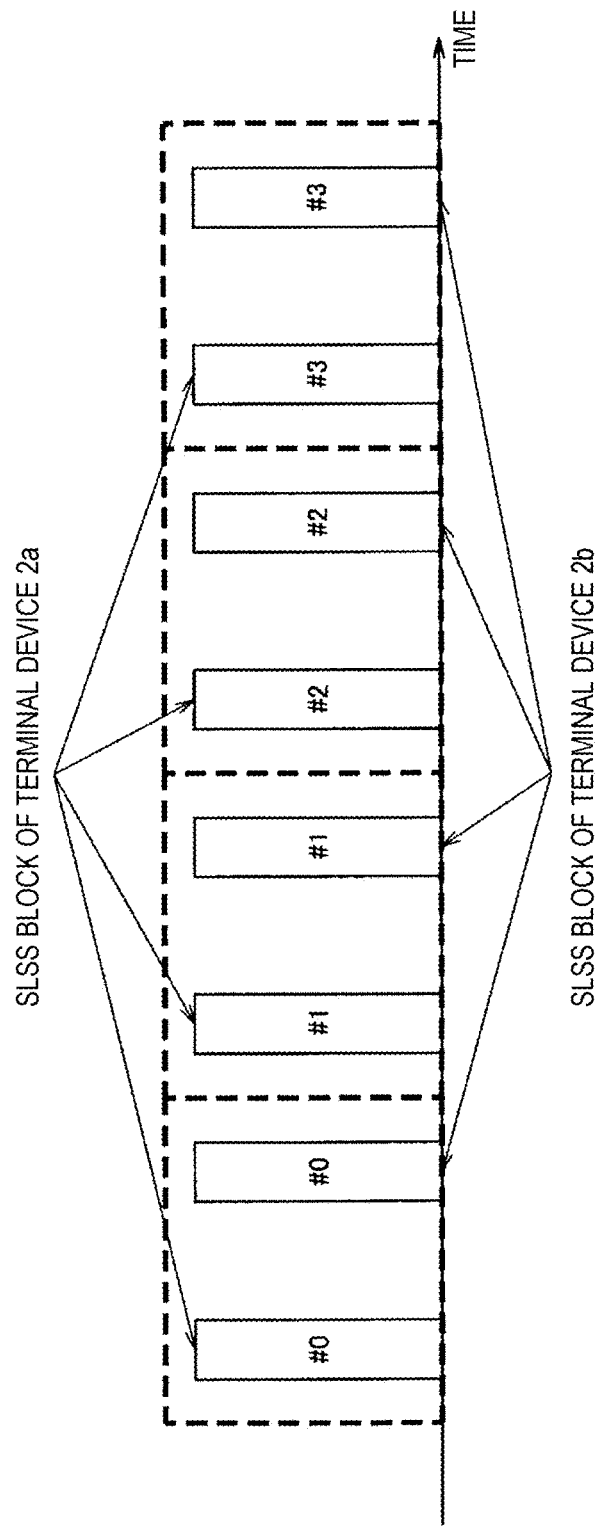
FIG. 15 is an explanatory diagram for describing another example of an arrangement pattern of the SLSS blocks.

Furthermore, FIG. 15 is an explanatory diagram for describing another example of an arrangement pattern of the SLSS blocks. Specifically, FIG. 15 illustrates another example of a pattern related to an arrangement of the SLSS blocks in a case where the SLSS blocks are arranged in a time direction. In FIG. 15, a horizontal axis represents a time.

In the example illustrated in FIG. 15, an arrangement of SLSS blocks for every terminal device 2 is patterned so that the SLSS blocks for every terminal device 2 are transmitted in a distributed manner. With such a configuration, in the example illustrated in FIG. 15, it becomes possible to use regions (for example, periods in the time direction) in which the SLSS blocks for every terminal device 2 are not transmitted, for transmission of other data (for example, ultra-reliable and low latency communications (URLLC) data, emergency data, and the like).

<Candidate for Arrangement Pattern of SLSS Blocks>

Next, an example of a case where candidates for an arrangement pattern of the SLSS blocks is set in advance and the terminal device 2 selects a candidate to be used as an arrangement pattern of the SLSS blocks by the terminal device 2 among the candidates will be described. Note that in the following description, each of the candidates for the arrangement pattern of the SLSS blocks is also referred to as an "SLSS block set" for convenience. Furthermore, the SLSS block set corresponds to an example of a "synchronization signal set" in which a plurality of synchronization signals (for example, a plurality of SLSS blocks) is associated with each other.

Setting Example 1 (Localized Manner) of SLSS Block Set

Figure 16:
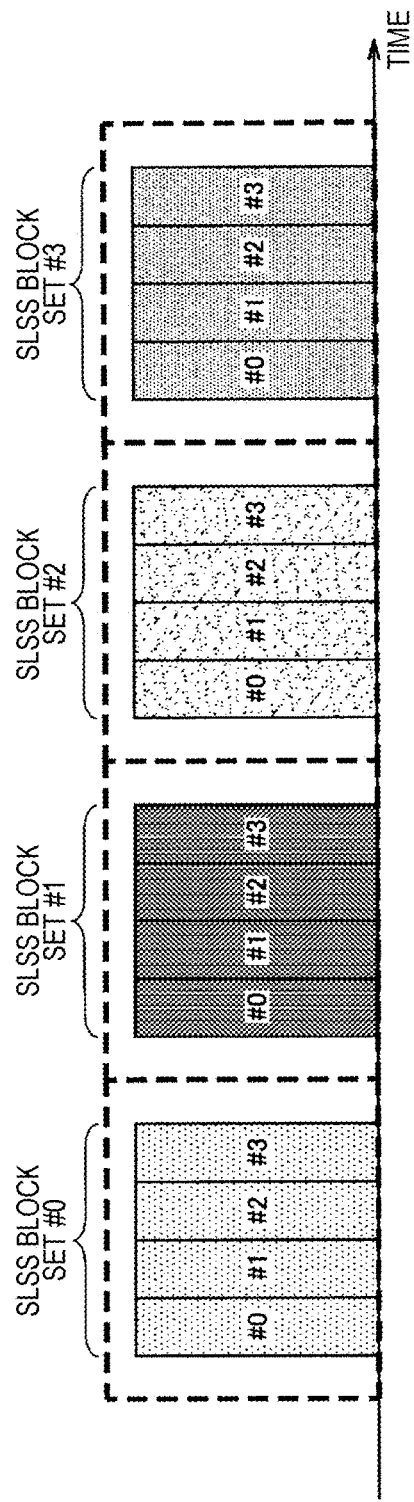
FIG. 16 is an explanatory diagram for describing an example of a setting method of an SLSS block set.

For example, FIG. 16 is an explanatory diagram for describing an example of a setting method of the SLSS block set. Specifically, FIG. 16 illustrates an example of a setting method of the SLSS block set in a case where the SLSS blocks are arranged in the time direction. In FIG. 16, a horizontal axis represents a time. Furthermore, FIG. 16 illustrates an example of a case where SLSS block sets #0 to #4 are set. Specifically, in the example illustrated in FIG. 16, for each of the SLSS block sets #0 to #3, each SLSS block set is set so that a series of SLSS blocks are continuously transmitted in a predetermined section (for example, in a slot, in a half frame, or in a radio frame), similarly to the example illustrated in FIG. 14.

Setting Example 2 (Distributed Manner) of SLSS Block Set

Figure 17:
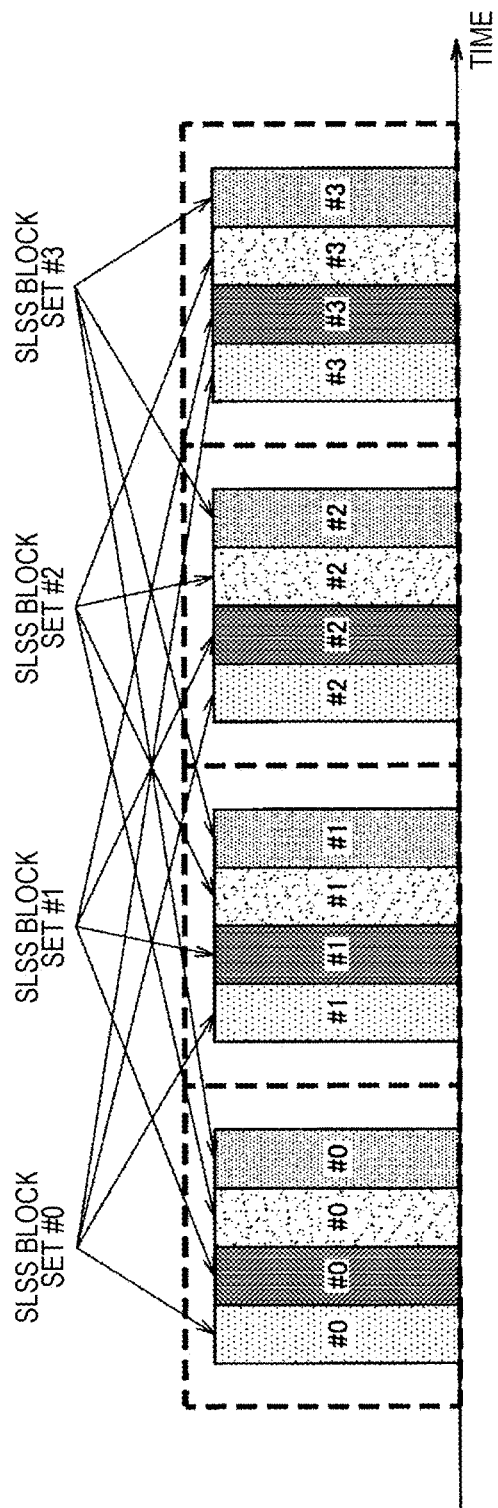
FIG. 17 is an explanatory diagram for describing another example of a setting method of an SLSS block set.

Furthermore, FIG. 17 is an explanatory diagram for describing another example of a setting method of the SLSS block set. Specifically, FIG. 17 illustrates another example of a setting method of the SLSS block set in a case where the SLSS blocks are arranged in the time direction. In FIG. 17, a horizontal axis represents a time. Furthermore, FIG. 17 illustrates an example of a case where SLSS block sets #0 to #4 are set. Specifically, in the example illustrated in FIG. 17, for each of the SLSS block sets #0 to #3, each SLSS block set is set so that a series of SLSS blocks are transmitted in a distributed manner, similarly to the example illustrated in FIG. 15.

The terminal device 2 selects any one of the plurality of SLSS block sets set in such a manner, and transmits the SLSS using the SLSS block set. Furthermore, the terminal device 2 may select one or a plurality of SLSS blocks of a plurality of SLSS blocks included in one selected SLSS block set, and use the selected SLSS block for transmitting the SLSS. That is, the terminal device 2 may not necessarily use all the SLSS blocks included in the selected SLSS block set for transmitting the SLSS. For example, the number of SLSS blocks that the terminal device 2 is to use for transmitting the SLSS may be determined according to the number and/or widths of beams implemented in the terminal device 2, a communication environment (a center frequency and a bandwidth, a geographical location, a base station device coverage, a weather, and a traveling situation), an assumed use case (a requested quality of service (QoS) or a traffic type, and a requested situation from a peripheral communication device), and the like.

<Transmission Manner of SLSS Block>

Next, an example of a transmission method of the SLSS block will be described. Note that in the present description, for convenience, unless otherwise specified, it is assumed that a transmitting side of the SLSS block is the terminal device 2a and a receiving side of the SLSS block is the terminal device 2b.

(1) Combination of Cyclic Transmission and Transmission in Random Pattern

First, an example of a case of combining cyclic transmission and transmission in a random pattern with each other when transmitting the SLSS block will be described. In this example, the SLSS is transmitted in a predetermined pattern in a certain cycle. However, in a case where a cycle and a pattern substantially coincide among a plurality of terminal devices, it becomes difficult for each of the plurality of terminal devices to receive the SLSS transmitted from the other terminal devices. Therefore, in this example, an SLSS block set to be used is changed on the basis of a predetermined condition. As a specific example, the terminal device 2 may change the SLSS block set to be used on a regular basis. As such, the terminal device 2 switches a pattern in which the SLSS blocks are arranged in the regions to which the resources of the wireless communication are allocated, according to a predetermined condition.

In this example, information regarding at least one of an SLSS block set that is being used by the terminal device 2a or an SLSS block set that is scheduled to be used next by the terminal device 2a is included in the SLSS block (PSBCH). As a specific example, notification of an index of the SLSS block set is provided using the SLSS block. The terminal device 2b that has received the SLSS block transmitted from the terminal device 2a recognizes the index of the SLSS block set, attempts to receive the SLSS at that timing, and does not perform transmission of the SLSS at that timing.

Figure 18:
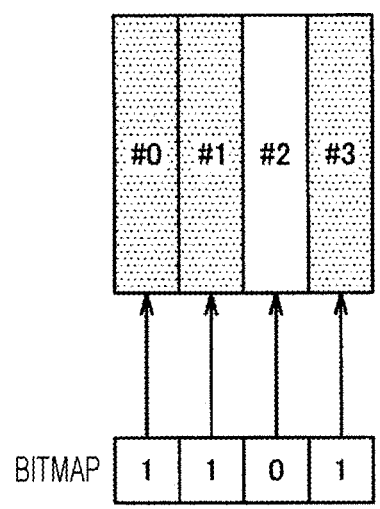
FIG. 18 is an explanatory diagram for describing a method of providing notification of a use situation of the SLSS block by a bitmap.

Furthermore, notification of the number of SLSS blocks transmitted from the terminal device 2a (for example, the number of SLSS blocks in one cycle) may be provided by the PSBCH. An example of a notification method includes a notification by a bitmap. For example, FIG. 18 is an explanatory diagram for describing a method of providing notification of a use situation of the SLSS block by a bitmap. In an example illustrated in FIG. 18, 4-bit information associated with respective different bits of SLSS blocks #0 to #3 is used as the bitmap. As a specific example, in the example illustrated in FIG. 18, "0" is set for a bit associated with an SLSS block that is being used among the respective bits configuring the bitmap, and "1" is set for a bit associated with an SLSS block that is not being used among the respective bits. More specifically, in the example illustrated in FIG. 18, only an SLSS block #2 of the SLSS blocks #0 to #3 is being used. Therefore, "0" is set for a bit associated with the SLSS block #2 among the bits configuring the bitmap, and "1" is set for the other bits.

Furthermore, notification of a direction of each beam may be provided by the PSBCH. In this case, for example, notification of identification information (that is, a terminal ID or an ID of the terminal device) of the terminal device 2, which is a transmission source, and identification information (that is, a beam ID) of a beam may be provided by PSSS/SSSS/PSBCH. Furthermore, as another example, notification of the number of SLSSs in one cycle may be provided using the PSBCH.

As such, the terminal device 2 notifies another terminal device 2 of information regarding the switching of the pattern in a case where the terminal device 2 switches the pattern in which the SLSS blocks are arranged in the regions to which the resources of the wireless communication are allocated. Note that a timing of the notification is not particularly limited. As a specific example, the terminal device 2 may notify another terminal device 2 of information regarding the switching of the pattern in advance in a case where the switching of the pattern is scheduled. The advance notification of the pattern is a notification of a pattern for a predetermined transmission timing. It is desirable that the predetermined transmission timing is the next transmission timing. Note that the advance notification of the pattern can be switched at an arbitrary transmission timing by including information regarding a switching timing. Furthermore, as another example, the terminal device 2 may notify another terminal device 2 of information regarding the switching of the pattern after the switching in a case where the terminal device 2 switches the pattern. Furthermore, when switching the pattern, the number of SLSSs in one cycle may be changed. In this case, as described above, it is only required to notify another terminal device 2 of the number of SLSSs in one cycle after the change of the pattern. Furthermore, when switching the pattern, a setting (localized manner or distributed manner) of the SLSS block set may be changed.

(2) Request for SLSS Block on Demand

Next, an example of a case of requesting a sidelink synchronization signal (SLSS) block from a receiving side on demand will be described. In this example, a transmission resource of the SLSS block is determined in response to the request from the terminal device 2b on the receiving side to the terminal device 2a on a transmitting side. Specifically, the terminal device 2b on the receiving side transmits an on-demand SLSS block request to the terminal device 2a on the transmitting side. At this time, the terminal device 2b associates information regarding the future reception timing with the on-demand SLSS block request. The terminal device 2a on the transmitting side transmits the SLSS block in consideration of the future reception timing of the terminal device 2b notification of which is provided in association with the on-demand SLSS block request from the terminal device 2b.

The information included in the on-demand SLSS block request includes information regarding the future reception timing (that is, a time resource in which the SLSS block may be transmitted). Note that the on-demand SLSS block request may include information regarding a frequency and a bandwidth of the future reception, information regarding a beam, position information of the terminal device, ID of the terminal device, and the like.

Examples of a physical channel used for a request for transmission of the SLSS block to the transmitting side, such as the on-demand SLSS block request described above, or the like, include a PSSCH (sidelink data channel), a PSBCH (system information in the sidelink), and a PSDCH (channel for discovery), and the like.

It is desirable that the on-demand SLSS block request is transmitted in a designated section (on-demand SLSS block request window). It is desirable that the on-demand SLSS block request window is common between the terminal devices. In the on-demand SLSS block request window, it is desirable that a terminal device other than a terminal device requesting the on-demand SLSS block performs monitoring of the physical channel. Notification of the on-demand SLSS block request window is provided from a base station device, a local manager terminal, and a terminal device other than a terminal device requesting synchronization. A setting parameter of the on-demand SLSS block request window includes at least a time section and a cycle, and may also include information regarding a frequency resource and information regarding transmission and/or reception beams.

Furthermore, a frequency (a center frequency of a different carrier wave or a different operating band) different from a frequency used for transmission of the SLSS block may be used for the request for the transmission of the SLSS block. As a specific example, the request for the transmission of the SLSS block using an operating band of a 60 GHz band may be transmitted using an operating band of a 6 GHz band.

(3) Control Based on Instruction from Base Station

Next, an example of a case where the transmission of the SLSS block is controlled on the basis of an instruction from the base station will be described. In this example, the terminal device 2a, which is the transmitting side, transmits the SLSS block with an SLSS block set or pattern triggered by the base station device 1. Specifically, information regarding communication via the sidelink is transmitted to each terminal device 2 by RRC signaling from the base station device 1. The terminal device 2a on the transmitting side transmits the SLSS block on the basis of an RRC setting notification of which is provided from the base station device 1. Furthermore, the terminal device 2b on the receiving side receives the SLSS block on the basis of the RRC setting notification of which is provided from the base station device 1.

<Local Manager Terminal>

Next, the local manager terminal will be described. The local manager terminal is a terminal device 2 that has authority regarding control of the communication via the sidelink, and can perform, for example, radio resource control of the local manager terminal itself and radio resource control (radio resource management) of another terminal around the local manager terminal. For example, the local manager terminal can allocate a resource (or a resource pool) to another terminal device 2 among resource pools given by the base station device 1. Furthermore, the local manager terminal may control the transmission of the SLSS by another terminal device 2, similarly to a case of the base station described above.

The local manager terminal notifies (for example, broadcasts to) another terminal device 2 around the local manager terminal that it is a local manager terminal. Note that it is preferable that the notification is broadcast using, for example, a PSBCH. Another terminal device 2 that is not the local manager terminal performs connection processing to the local manager terminal when it receives the SLSS block transmitted from the local manager terminal.

The local manager terminal can broadcast local system information (local SIB) to the terminal device 2 around the local manager terminal. The local system information is broadcast using, for example, a PSSCH. Information included in the local system information includes the following.

Information related to timing advance (timing advance measurement resource and the like)

Information regarding local resource (sub-resource pool, SLSS block, time division duplex (TDD) setting (uplink/downlink setting, slot format and the like) information, and the like)

Local group ID (ID of local manager terminal, and the like)

Information regarding SLSS (information regarding SLSS block set and information regarding arrangement pattern of SLSS blocks)

Another terminal device 2 connected to the local manager terminal notifies the local manager terminal of various information. The various information includes, for example, a buffer status report (BSR) of the sidelink, RRM measurement results (an RSRP, an RSSI, a channel busy ratio (CBR), a channel occupancy ratio (COR), and the like). The local manager terminal may perform resource management of the sidelink on the basis of the notification from another terminal device 2. Note that one local manager terminal is only required to exist for every predetermined range (for example, zone).

<Unicast Communication of Sidelink>

Next, an outline of unicast communication via the sidelink will be described. In order to perform the unicast communication via the sidelink, adjustment of at least one of a transmission timing or a reception timing is performed. An example of a method of adjusting the transmission timing includes a method using timing advance.

(1) Solution 1

First, as solution 1, an example of a case of applying a timing advance value using a random access channel (RACH) procedure similar to that of an uplink will be described. For example, FIG. 19 is a sequence diagram illustrating an example of a procedure related to establishment of unicast communication via the sidelink, and illustrates an example of a procedure corresponding to solution 1.

Figure 19:
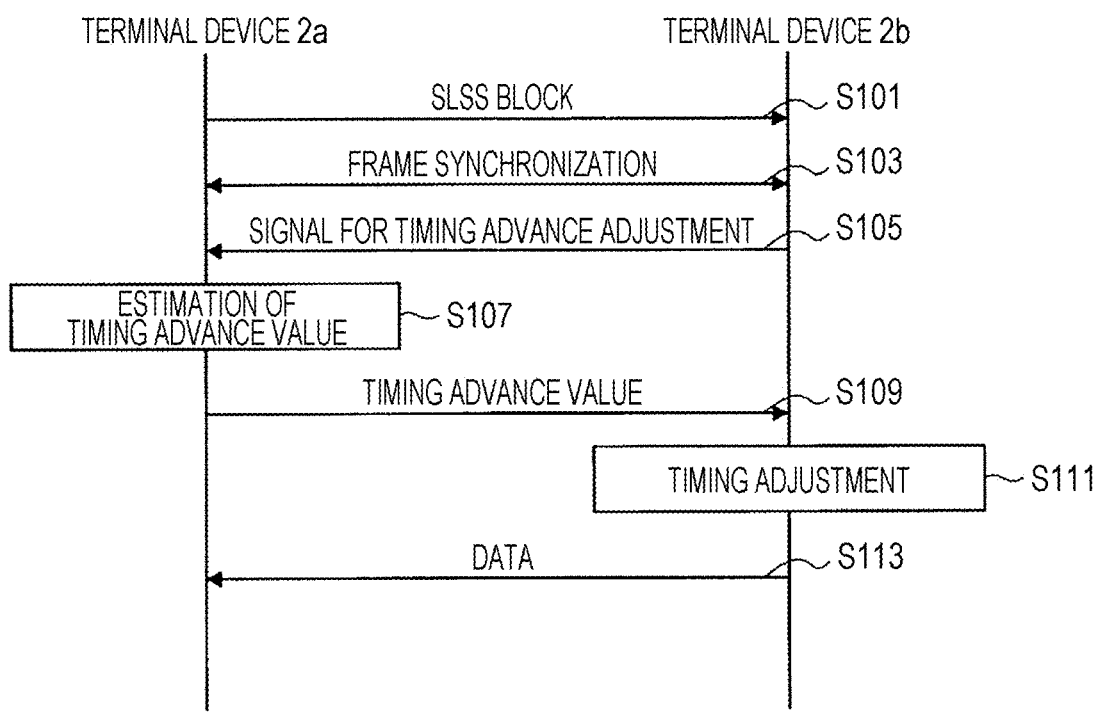
FIG. 19 is a sequence diagram illustrating an example of a procedure related to establishment of unicast communication via a sidelink.

As illustrated in FIG. 19, an SLSS block is transmitted from the terminal device 2a to another terminal device 2 (for example, the terminal device 2b) located around the terminal device 2a (S101). The terminal device 2b located around the terminal device 2a receives the SLSS block transmitted from the terminal device 2a, and performs frame synchronization with the terminal device 2a on the basis of the SLSS block (S103).

Next, the terminal device 2b transmits a signal for timing advance adjustment (for example, an SLSS, a PSDCH, a PRACH, a CSI-RS, an SRS, or the like) corresponding to the received SLSS block to the terminal device 2a at an appropriate timing, on the basis of control information such as a PSBCH or the like. The terminal device 2a estimates a timing advance value on the basis of the signal for timing advance adjustment transmitted from the terminal device 2b (S107), and notifies the terminal device 2b of the timing advance value (S109). Specifically, the timing advance value is calculated from a time difference obtained by (TRx−TTx)/2. Here, TRx is a reception timing of the signal for timing advance adjustment, and TTx is a transmission timing of the signal for timing advance adjustment. Note that it is preferable that the timing advance value is unicast-transmitted and provided in notification to the terminal device 2b, for example, by a PSSCH or the like.

Then, the terminal device 2b performs timing adjustment based on the timing advance value transmitted from the terminal device 2a (S111) when transmitting data to the terminal device 2a, and transmits data to the terminal device 2a by unicast communication (S113).

Hereinabove, as solution 1, the example of the case of applying the timing advance value using the RACH procedure similar to that of the uplink has been described with reference to FIG. 19.

(2) Solution 2

Next, as Solution 2, an example of a case where a timing advance value is applied on the basis of a difference between a frame synchronization timing common between terminal devices and a reception timing of an SLSS block will be described. For example, FIG. 20 is a sequence diagram illustrating another example of a procedure related to establishment of unicast communication via the sidelink, and illustrates an example of a procedure corresponding to solution 2.

Figure 20:
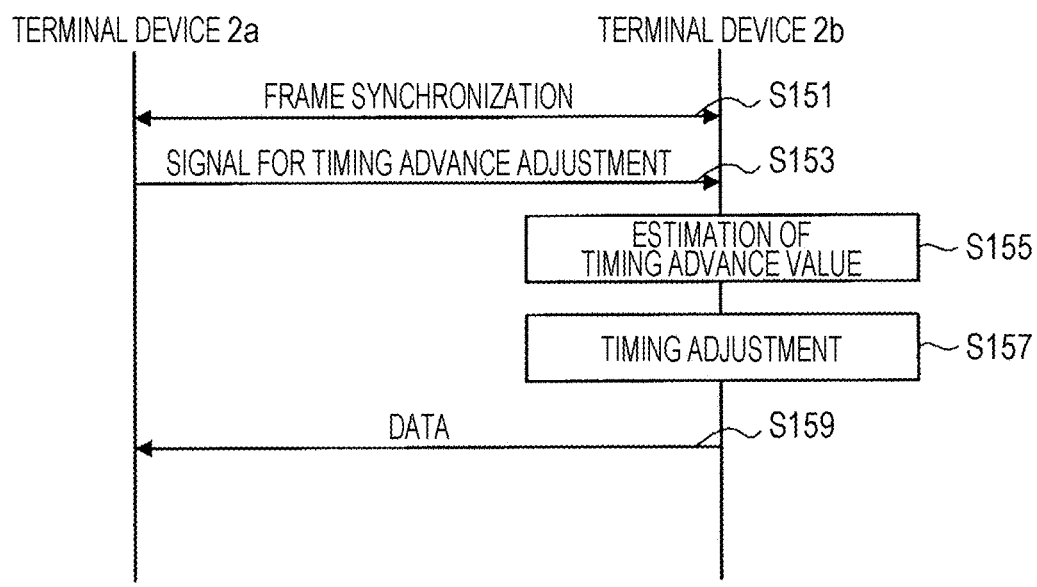
FIG. 20 is a sequence diagram illustrating another example of a procedure related to establishment of unicast communication via a sidelink.

As illustrated in FIG. 20, the terminal devices 2a and 2b perform frame synchronization based on a predetermined method. The frame synchronization is executed on the basis of, for example, a global navigation satellite system (GNSS), a downlink signal from the base station device 1, an SLSS from the local manager terminal, or the like (S151).

Next, the terminal device 2a transmits a signal (SLSS) for timing advance adjustment to the terminal device 2b at a frame timing according to a result of the frame synchronization (S153). The terminal device 2b estimates a timing advance value on the basis of a difference between a reception timing of the signal for timing advance adjustment transmitted from the terminal device 2a and the frame timing according to the result of the frame synchronization (S155). Specifically, the timing advance value is calculated from a time difference obtained by TRx−Tframe. Here, TRx is the reception timing of the signal for timing advance adjustment, and Tframe is a timing at a head of a frame in which the timing advance value is transmitted.

Then, the terminal device 2b performs timing adjustment based on an estimation result of the timing advance value (S157) when transmitting data to the terminal device 2a, and transmits data to the terminal device 2a by unicast communication (S159).

Hereinabove, as Solution 2, the example of the case where the timing advance value is applied on the basis of the difference between the frame synchronization timing common between the terminal devices and the reception timing of the SLSS block has been described with reference to FIG. 20.

(3) Control Based on Instruction from Base Station

Hereinabove, an example of a case where the timing advance value for performing the unicast communication between the terminal devices 2a and 2b via the sidelink is determined on the basis of the procedure between the terminal devices 2a and 2b has been described. On the other hand, the timing advance value for performing the unicast communication between the terminal devices 2a and 2b via the sidelink may be determined on the basis of an instruction from the base station device 1. For example, when the terminal device 2b transmits the data to the terminal device 2a, the terminal device 2b is only required to perform timing adjustment based on the timing advance value notification of which is provided from the base station device 1 and then transmit the data to the terminal device 2a. Furthermore, the timing advance value may be determined on the basis of an instruction from the local manager terminal instead of the base station device 1.

(4) Transmission Timing Switching of Link Between Terminal Devices of Unicast Communication In the terminal device 2, for example, a timing advance value is set for each unicast link. Examples of a method of identifying the unicast link include a method based on a transmission grant (sidelink grant) from another terminal device 2. It is preferable that the transmission grant is included in, for example, a PSCCH. Furthermore, as another example, the unicast link may be identified on the basis of a setting result of a grant-free resource for another terminal device 2. On the other hand, the terminal device 2 starts transmission at a timing of frame synchronization for broadcast.

As described above, the terminal device 2 may independently control a transmission timing of communication with destination designation such as unicast and a transmission timing of communication without destination designation such as broadcast. Note that the communication with destination designation such as the unicast corresponds to an example of "first communication", and a transmission timing of the communication corresponds to an example of a "first transmission timing". Furthermore, the communication without destination designation such as the broadcast corresponds to an example of "second communication", and a transmission timing of the communication corresponds to an example of a "second transmission timing".

(5) Change of Resource Pool According to Cast Type

A used resource pool may be changed according to a cast type of communication between the terminal devices 2 via the sidelink.

<Example of Synchronization Between Terminal Devices>

Next, an example of synchronization between the terminal devices 2 that perform inter-device communication (for example, V2V communication) via the sidelink will be described.

As the synchronization between the terminal devices 2, "global synchronization", "local synchronization", and "hybrid synchronization" can be applied. The global synchronization is synchronization shared in common between the terminal devices. An advantage of applying the global synchronization is that a timing of reservation or sensing of resources is aligned between all the terminal devices 2. The local synchronization is synchronization shared between predetermined areas or between predetermined terminal devices/terminal device groups. An advantage of applying the local synchronization is that a timing is aligned between a plurality of transmission/reception points. The hybrid synchronization corresponds to a combination of the global synchronization and the local synchronization. As a specific example, the terminal device 2 applies the global synchronization to broadcast transmission such as an SLSS, a PSDCH, a PSCCH/PSSCH for transmitting broadcast information, or the like, and applies the local synchronization to unicast communication such as a PSCCH/PSSCH for transmitting unicast information, or the like. As another specific example, the terminal device 2 may apply the global synchronization to communication using a 6 GHz band or lower, and applies the local synchronization to communication using a 6 GHz band or higher. Furthermore, the local manager terminal (that is, the terminal device 2 having authority of resource control) is only required to be responsible for the terminal device, which is the center of the local synchronization.

<Example of Control According to Zone>

Next, an example of control of inter-device communication (for example, V2V communication) via the sidelink according to a region (hereinafter, also referred to as a "zone") determined by a geographical position will be described.

(1) Notification of Information for Setup

First, an example of a link setup method will be described. For example, a discovery signal may be used for link setup. As a specific example, it is only required to associate the discovery signal with link setup information (SIB) in an operating band of a millimeter wave band such as 60 GHz and the like. Therefore, it becomes possible for the terminal device 2 that has received the discovery signal to perform the link setup on the basis of the millimeter wave setup information associated with the discovery signal.

Furthermore, assist information for assisting the link setup in the operating band of the millimeter wave band may be associated with a response to the discovery signal. Furthermore, the response may be associated with position information of the terminal device 2 (for example, the terminal device 2 that has received the discovery signal).

Furthermore, information regarding a capability (for example, support band information in the millimeter wave operating band) or information regarding the HD (for example, information regarding a transmission timing or a reception timing) may be associated with the discovery signal or the response.

(2) Conventional Example (6 GHz)

Next, as a comparative example, a conventional example using a 6 GHz band will be described as an example of a procedure or a setting for determining a frequency or a band to be used according to a zone.

Specifically, the terminal device 2 first identifies a position of the terminal device 2 itself by using a GNSS or the like. Subsequently, the terminal device 2 determines a zone to which the terminal device 2 itself belongs on the basis of information of the position of the terminal device 2 itself and a calculation equation of the zone. Then, the terminal device 2 performs transmission of a physical channel/signal of the sidelink using a frequency or a band associated with the zone to which the terminal device 2 itself belongs.

Figure 21:
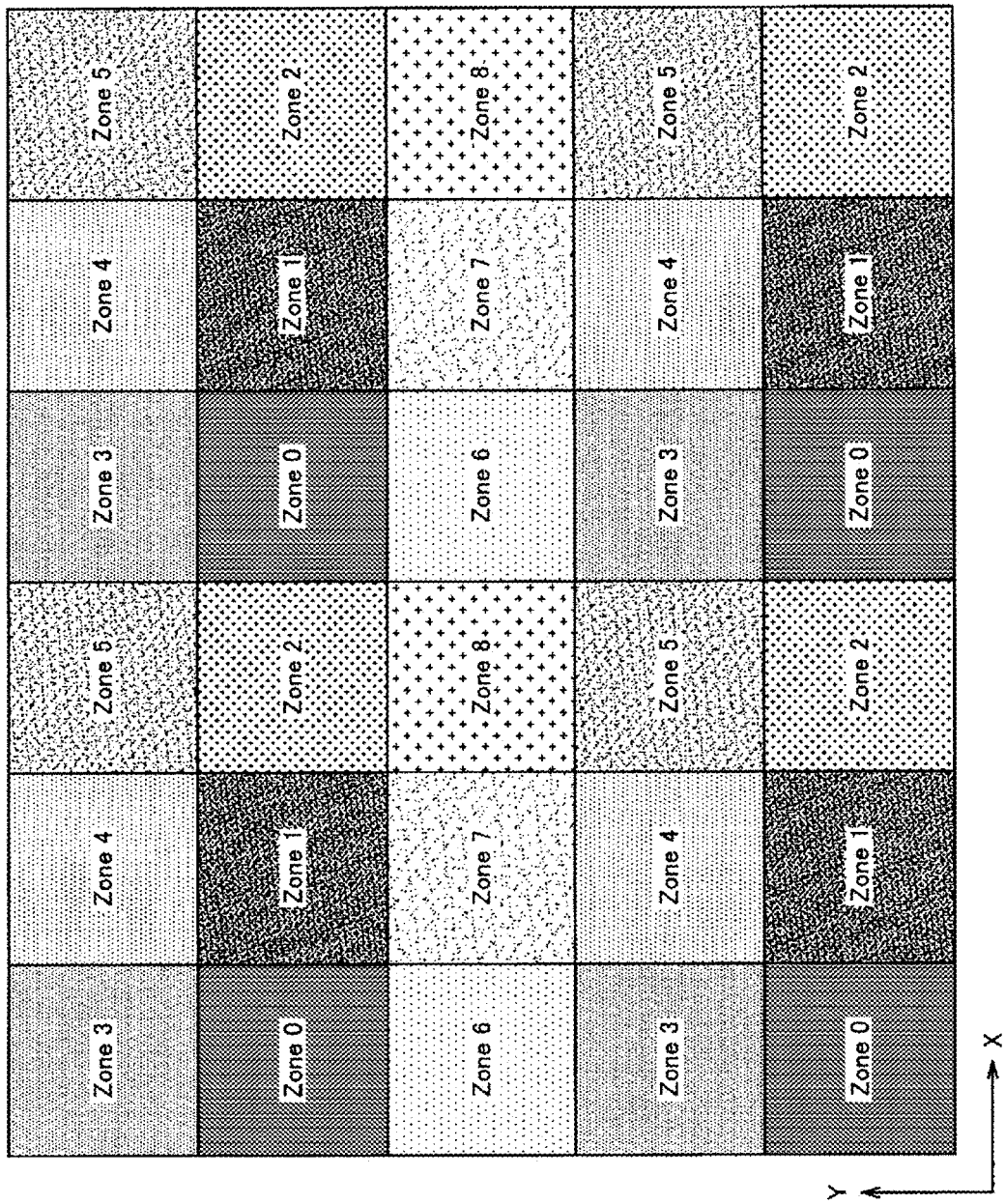
FIG. 21 is an explanatory diagram for describing an example of a relationship between a geographical position of the terminal device and a zone ID.

For example, FIG. 21 is an explanatory diagram for describing an example of a relationship between a geographical position of the terminal device and a zone ID. In FIG. 21, for convenience, the geographical position is schematically illustrated by a horizontal axis (X axis) and a vertical axis (Y axis). Furthermore, in an example illustrated in FIG. 21, each region set according to the geographical position is set as any one of Zone 0 to Zone 8.

An example of a calculation equation through which the terminal device 2 calculates the zone ID on the basis of the geographical position is shown below as (Equation 1) to (Equation 3).

[Math 1]

$$x'=\text{Ceil}((x-x0)/L)\text{Mod } Nx \qquad (\text{Equation 1})$$

$$y'=\text{Ceil}((y-y0)/W)\text{Mod } Ny \qquad (\text{Equation 2})$$

$$\text{Zone ID}=g\{x',y'\} \qquad (\text{Equation 3})$$

In the above (Equation 1) and (Equation 2), x and y are parameters indicating the geographical position of the terminal device 2. That is, x indicates a position of the terminal device 2 in an X-axis direction. Furthermore, y indicates a position of the terminal device 2 in a Y-axis direction. Furthermore, in the above (Equation 1), x0 is information indicating a reference position in the X-axis direction. Furthermore, L is information indicating a width of each zone in the X-axis direction. Furthermore, Mod indicates an operator for calculating the remainder of division. That is, a constant Nx is set according to how many zones are set along the X-axis direction. Furthermore, in the above (Equation 2), y0 is information indicating a reference position in the Y-axis direction. Furthermore, W is information indicating a width of each zone in the Y-axis direction. Furthermore, a constant Ny is set according to how many zones are set along the Y-axis direction. Furthermore, a function g indicates a function for calculating the zone ID according to an input. For example, in (Equation 3), the function g is a function for calculating the zone ID using x' and y' as variables. Note that each of x0, y0, L, W, Nx, and Ny shown in the above (Equation 1) and (Equation 2) is a parameter given in advance.

A more specific example of a calculation equation through which the terminal device 2 calculates the zone ID on the basis of the geographical position is shown below as (Equation 4) to (Equation 6).

[Math 2]

$$x'=\text{Ceil}((x-x0)/L)\text{Mod } Nx \qquad (\text{Equation 4})$$

$$y'=\text{Ceil}((y-y0)/W)\text{Mod } Ny \qquad (\text{Equation 5})$$

$$\text{Zone ID } y'*Nx+x' \qquad (\text{Equation 6})$$

The above (Equation 4) and (Equation 5) are similar to the abovementioned (Equation 1) and (Equation 2). Furthermore, (Equation 6) corresponds to an example of a case where the function g is embodied in the abovementioned (Equation 3).

Figure 22:
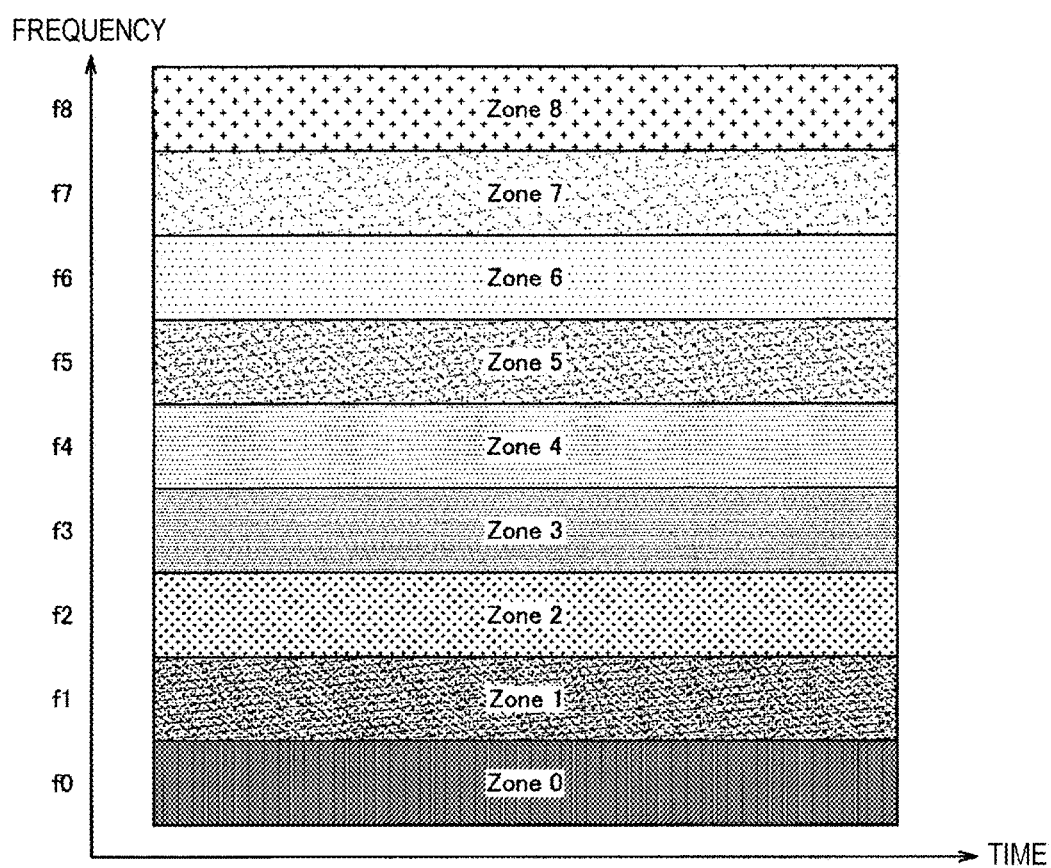
FIG. 22 is a diagram illustrating an example of a relationship between the zone ID and an allocated frequency band.

Furthermore, FIG. 22 is a diagram illustrating an example of a relationship between the zone ID and an allocated frequency band. In FIG. 22, a horizontal axis represents a time, and a vertical axis represents a frequency. Furthermore, in the example illustrated in FIG. 22, f1 to f8 correspond to indexes indicating predetermined frequency bands (for example, bandwidth parts (BWPs)). Here, in a case where the index indicating the frequency band is f_id and the zone ID corresponding to each zone is Zone_id, an index of a frequency band used for transmitting a signal of the sidelink is calculated by, for example, a calculation equation shown below as (Equation 7).

[Math 3]

$$f\_id=\text{Zone\_id} \qquad (\text{Equation 7})$$

(3) Example Case of Using Band of 6 GHz or Higher

Next, an example of processing and setting in a case of using a band of 6 GHz or higher will be described. As described above, in a case of using the band of 6 GHz or higher (particularly, a millimeter wave band such as 60 GHz or the like), the beamforming may be applied. Therefore, for the band of 6 GHz or higher, for example, a frequency or a band to be used is only required to be determined according to a beam (direction) to be transmitted in addition to the zone.

As a specific example, the frequency or the band to be used may be determined on the basis of the zone ID or a beam ID. In this case, for example, the frequency or the band may be reused according to a combination of the zone and a direction of the beam. With such control, it becomes possible to perform the frequency reuse (frequency repetition) in a narrower area, such that it becomes possible to improve area frequency utilization efficiency.

In order to realize the control described above, for example, the base station device 1 is only required to notify the terminal device 2 of a frequency table of the beamforming that can be used according to the zone and the direction. Furthermore, as another example, the frequency table may be preset in the terminal device 2.

Furthermore, the beam (direction) may be determined in view of at least one of elements exemplified below, for example.

Relative position between terminal device on transmitting side and terminal device on receiving side Moving speed of terminal device on transmitting side Moving speed of terminal device on receiving side Width of beam Number of antennas (antenna panels)

Furthermore, a width of the beam may be changed according to a relationship between the terminal device 2 on the transmitting side and the terminal device 2 on the receiving side. As a specific example, the width of the beam may be changed according to a relative moving direction or a relative moving speed between the terminal device 2 on the transmitting side and the terminal device 2 on the receiving side. For example, in a case where the relative moving speed between the terminal device 2 on the transmitting side and the terminal device 2 on the receiving side is high, it is desirable to use a beam having a large width.

Figure 23:
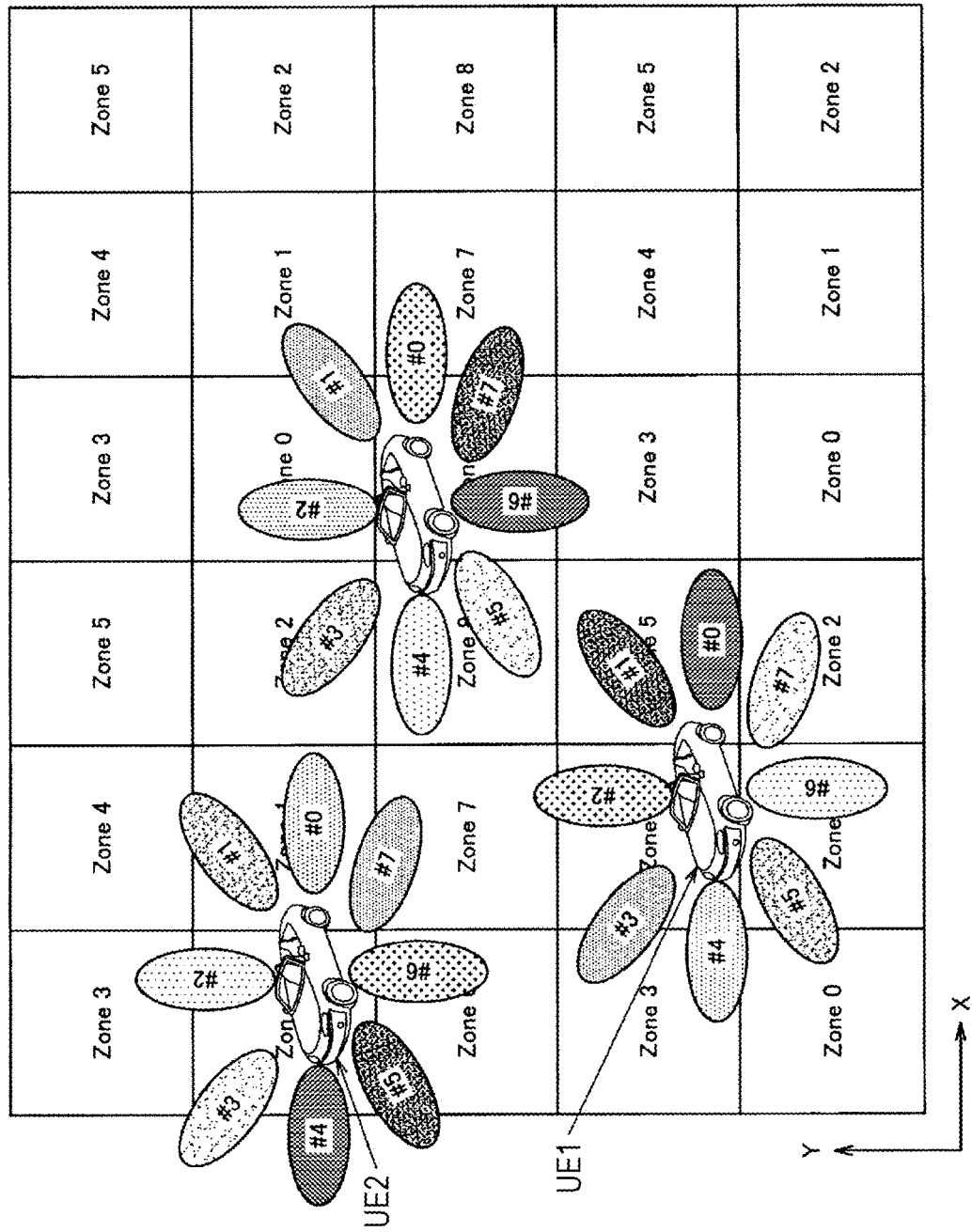
FIG. 23 is a diagram illustrating an example of a relationship among a zone ID, a beam ID, and a frequency band allocated to transmission.

For example, FIG. 23 is a diagram illustrating an example of a relationship among a zone ID, a beam ID, and a frequency band allocated to transmission. In FIG. 23, for convenience, the geographical position is schematically illustrated by a horizontal axis (X axis) and a vertical axis (Y axis). Furthermore, in an example illustrated in FIG. 23, each region set according to the geographical position is set as any one of Zone 0 to Zone 8. Furthermore, in FIG. 23, #0 to #7 schematically indicate beam IDs of respective beams formed by each terminal device 2 (for example, a vehicle). That is, in the example illustrated in FIG. 23, different beam IDs are set for each of a plurality of beams formed toward different directions. Furthermore, in FIG. 23, UE1 and UE2 schematically indicate terminal devices 2 (for example, vehicles) different from each other.

Figure 24:
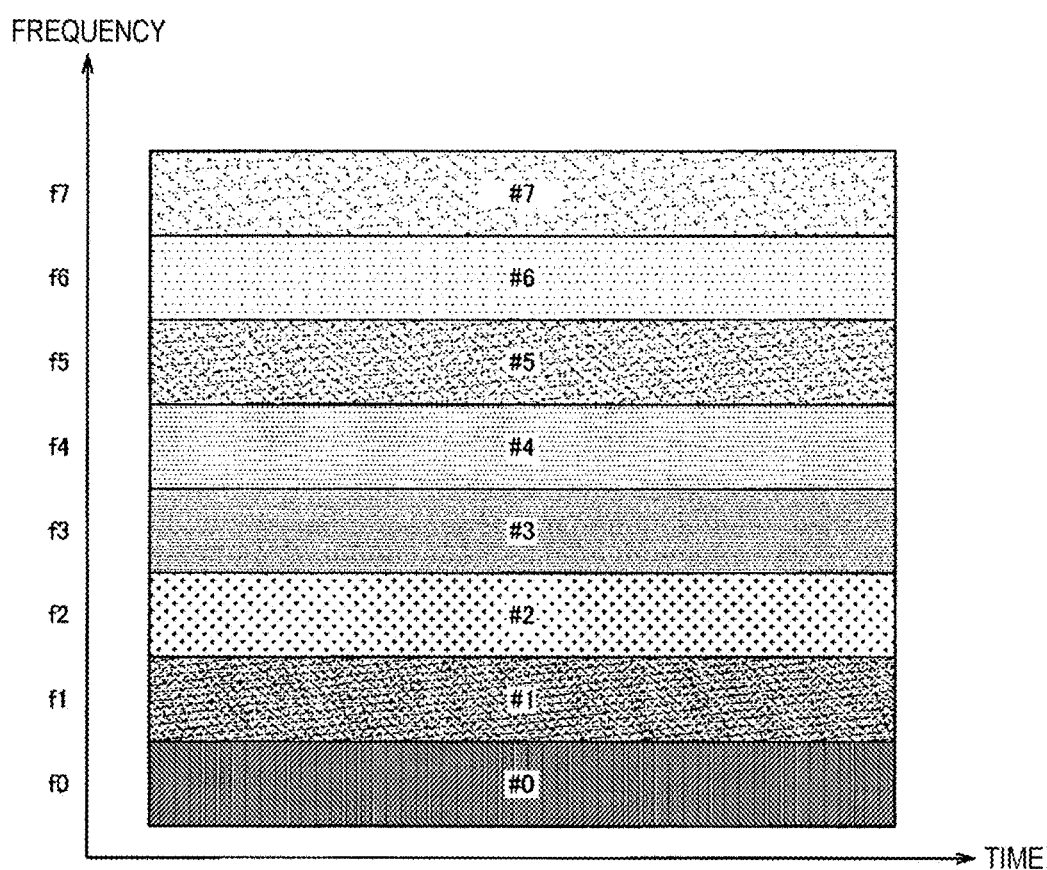
FIG. 24 is a diagram illustrating an example of a relationship between a beam ID and a frequency band allocated to transmission.

Furthermore, FIG. 24 is a diagram illustrating an example of a relationship between a beam ID and a frequency band allocated to transmission, and illustrates an example of a setting related to allocation of a frequency band to the terminal device 2 illustrated as UE1 in FIG. 23. In FIG. 24, a horizontal axis represents a time, and a vertical axis represents a frequency. Furthermore, in the example illustrated in FIG. 24, f0 to f7 correspond to indexes indicating predetermined frequency bands, similarly to the example illustrated in FIG. 22. That is, for the terminal device 2 illustrated as UE1, frequency bands with which the indexes f0 to f7 are associated are associated, respectively, with respective beams corresponding to beam IDs #0 to #7.

Figure 25:
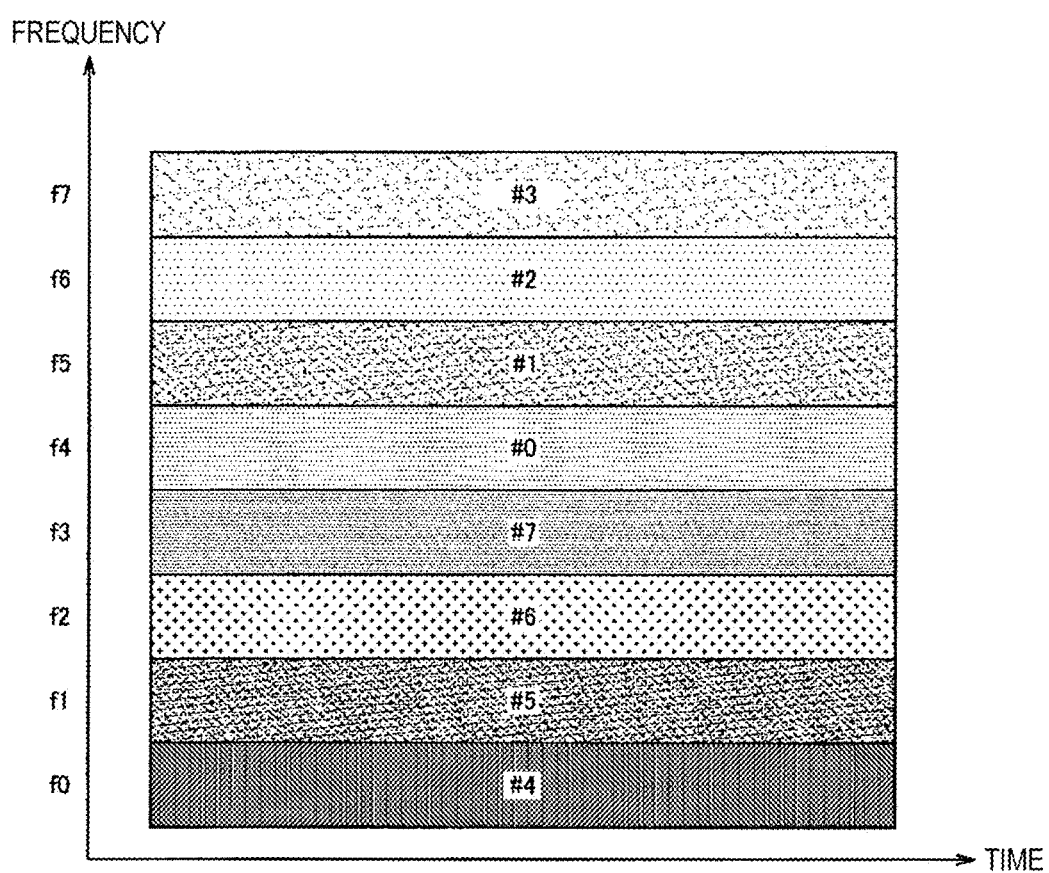
FIG. 25 is a diagram illustrating another example of a relationship between a beam ID and a frequency band allocated to transmission.

On the other hand, FIG. 25 is a diagram illustrating another example of a relationship between a beam ID and a frequency band allocated to transmission, and illustrates an example of a setting related to allocation of a frequency band to the terminal device 2 illustrated as UE2 in FIG. 23. In FIG. 25, a horizontal axis and a vertical axis are similar to those of the example illustrated in FIG. 24. Furthermore, in the example illustrated in FIG. 25, f0 to f7 also correspond to indexes indicating predetermined frequency bands, similarly to the example illustrated in FIG. 24. That is, for the terminal device 2 illustrated as UE2, frequency bands with which the indexes f4 to f7 are associated are associated, respectively, with respective beams corresponding to beam IDs #0 to #4. Furthermore, frequency bands with which the indexes f0 to f3 are associated are associated, respectively, with respective beams corresponding to beam IDs #4 to #7.

Here, an example of a calculation equation for calculating the zone ID from the geographical position of the terminal device 2 and the beam (direction) will be described. For example, it is possible to calculate the zone ID on the basis of a calculation equation shown below as (Equation 8) to (Equation 10). Note that (Equation 8) to (Equation 10) are substantially similar to the abovementioned (Equation 1) to (Equation 3), and a detailed description thereof will thus be omitted.

[Math 4]

$$x' = \text{Ceil}((x-x0)/L) \text{Mod } Nx \quad \text{(Equation 8)}$$

$$y' = \text{Ceil}((y-y0)/W) \text{Mod } Ny \quad \text{(Equation 9)}$$

$$\text{Zone ID} = g\{x', y'\} \quad \text{(Equation 10)}$$

Furthermore, an index of a frequency band used for transmission of data is calculated by, for example, a calculation equation shown below as (Equation 11).

[Math 5]

$$f\_id = f\{\text{Zone\_id}, \text{beam\_id}\} \quad \text{(Equation 11)}$$

In the above (Equation 11), beam_id is an index indicating the direction of the beam. Furthermore, a function f indicates a function for calculating the index of the frequency band used for transmission of data according to an input. For example, in (Equation 11), the function f is a function for calculating the index of the frequency band used for transmission using the zone ID and the index indicating the direction of the beam as variables. As a specific example of the function f, it is calculated by a calculation equation illustrated below (Equation 12). Note that in (Equation 12) shown below, Nf is a total number of indexes of frequency bands.

[Math 6]

$$f_{id} = \text{Zone}_{id} + \text{beam\_id Mod } Nf \quad \text{(Equation 12)}$$

Hereinabove, the example of the control of the inter-device communication (for example, the V2V communication) via the sidelink according to the region (zone) determined by the geographical position has been described.

4. Application Example

The technology according to the present disclosure can be applied to various products. For example, the base station device 1 may be realized as any kind of evolved Node B (eNB) such as a macro eNB, a small eNB, or the like. The small eNB may be an eNB that covers a cell smaller than a macro cell, such as a pico eNB, a micro eNB, a home (femto) eNB, or the like. Instead, the base station device 1 may be realized as another type of base station such as a Node B, a base transceiver station (BTS), or the like. The base station device 1 may include a main body (also referred to as a base station device) that controls wireless communication and one or more remote radio heads (RRHs) that are arranged at a place different from the main body. Furthermore, various types of terminals as described later may operate as the base station device 1 by temporarily or semi-permanently executing a base station function. Moreover, at least some components of the base station device 1 may be realized in the base station device or a module for the base station device.

Furthermore, for example, the terminal device 2 may be realized as a smartphone, a tablet personal computer (PC), a laptop PC, a portable game terminal, a mobile terminal such as a portable/dongle-type mobile router, a digital camera, or the like, or an in-vehicle terminal such as a car navigation device or the like. Furthermore, the terminal device 2 may be realized as a terminal (also referred to as a machine type communication (MTC) terminal) that performs machine to machine (M2M) communication. Moreover, at least some components of the terminal device 2 may be realized in a module (for example, an integrated circuit module including one die) mounted in these terminals.

<4.1. Application Example Related to Base Station>

First Application Example

Figure 26:
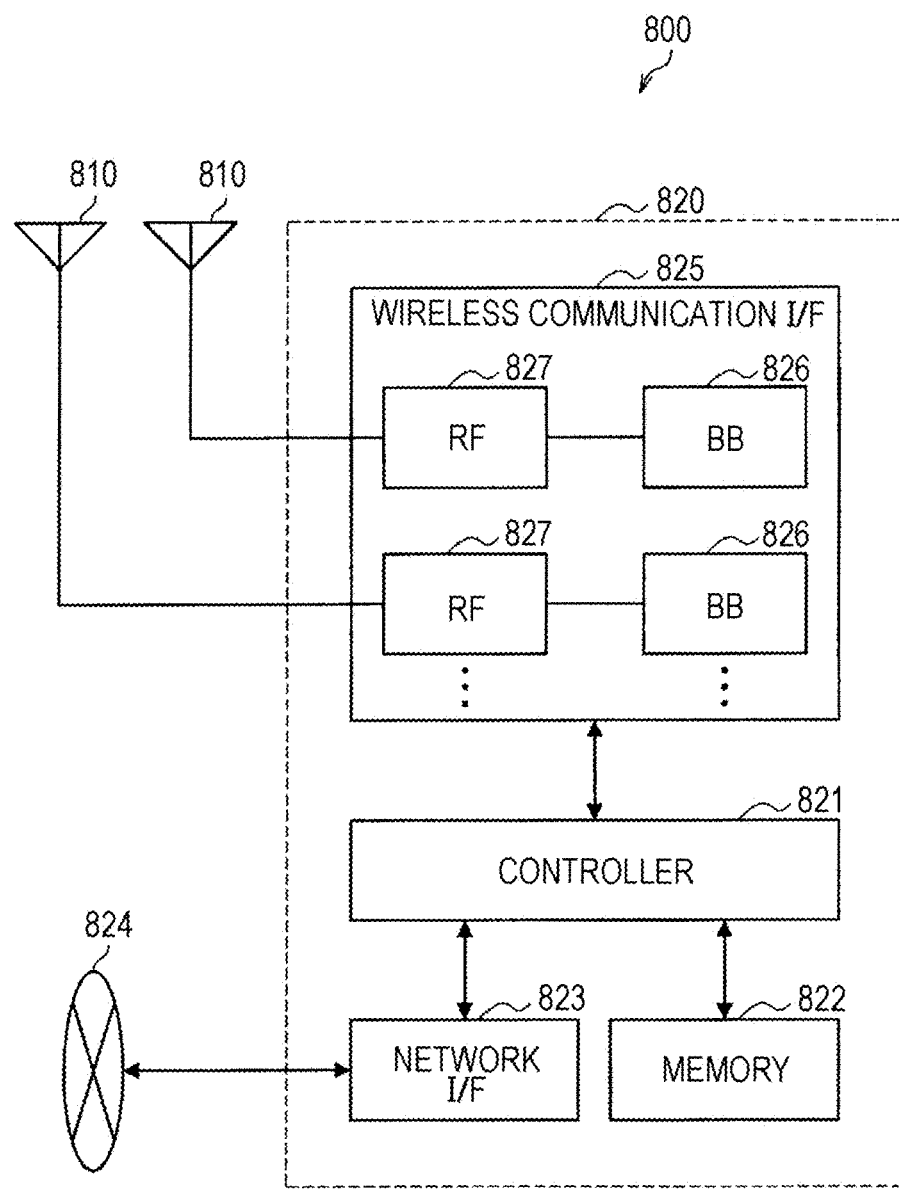
FIG. 26 is a block diagram illustrating a first example of a schematic configuration of an eNB.

FIG. 26 is a block diagram illustrating a first example of a schematic configuration of an eNB to which the technology according to the present disclosure can be applied. The eNB 800 includes one or more antennas 810 and a base station device 820. Each antenna 810 and the base station device 820 can be connected to each other via a radio frequency (RF) cable.

Each of the antennas 810 has a single or a plurality of antenna elements (for example, a plurality of antenna elements configuring a multiple-input multiple-output (MIMO) antenna), and is used to transmit and receive a radio signal by the base station device 820. The eNB 800 includes a plurality of antennas 810 as illustrated in FIG. 26, and the plurality of antennas 810 may correspond to, for example, a plurality of frequency bands used by the eNB 800, respectively. Note that an example in which the eNB 800 includes the plurality of antennas 810 has been illustrated in FIG. 26, but the eNB 800 may include a single antenna 810.

The base station device 820 includes a controller 821, a memory 822, a network interface 823, and a wireless communication interface 825.

The controller 821 may be, for example, a central processing unit (CPU) or a digital signal processor (DSP) and operates various functions of an upper layer of the base station device 820. For example, the controller 821 generates a data packet from data in a signal processed by the wireless communication interface 825 and transfers the generated data packet via the network interface 823. The controller 821 may generate a bundled packet by bundling data from a plurality of baseband processors and transfer the generated bundled packet. Furthermore, the controller 821 may have a logical function of executing control such as radio resource control, radio bearer control, mobility management, admission control, scheduling, or the like. Furthermore, the control may be executed in cooperation with a peripheral eNB or a core network node. The memory 822 includes a random access memory (RAM) and a read only memory (ROM), and stores a program executed by the controller 821 and various control data (for example, terminal list, transmission power data, scheduling data, and the like).

The network interface 823 is a communication interface for connecting the base station device 820 to a core network 824. The controller 821 may communicate with the core network node or another eNB via network interface 823. In that case, the eNB 800 and the core network node or another eNB may be connected to each other by a logical interface (for example, an S1 interface or an X2 interface). The network interface 823 may be a wired communication interface or a wireless communication interface for a wireless backhaul. In a case where the network interface 823 is the wireless communication interface, the network interface 823 may use a frequency band higher than a frequency band used by the wireless communication interface 825 for wireless communication.

The wireless communication interface 825 supports any one cellular communication manner such as long term evolution (LTE), LTE-Advanced or the like, and provides a wireless connection to a terminal located in a cell of the eNB 800 via the antenna 810. The wireless communication interface 825 can typically include a baseband (BB) processor 826, a radio frequency (RF) circuit 827, and the like. The BB processor 826 may perform, for example, coding/decoding, modulation/demodulation, multiplexing/demultiplexing, and the like, and executes various signal processing of each layer (for example, L1, medium access control (MAC), radio link control (RLC), and packet data convergence protocol (PDCP)). The BB processor 826 may have some or all of the logical functions described above instead of the controller 821. The BB processor 826 may be a module including a memory that stores a communication control program, a processor that executes the communication control program, and a related circuit, and a function of the BB processor 826 may be changeable by updating the communication control program. Furthermore, the module may be a card or a blade inserted into a slot of the base station device 820 or may be a chip mounted on the card or the blade. Meanwhile, the RF circuit 827 may include a mixer, a filter, an amplifier, and the like, and transmits and receives a radio signal via the antenna 810.

The wireless communication interface 825 includes a plurality of BB processors 826 as illustrated in FIG. 26, and the plurality of BB processors 826 may correspond to, for example, the plurality of frequency bands used by the eNB 800, respectively. Furthermore, the wireless communication interface 825 includes a plurality of RF circuits 827 as illustrated in FIG. 26, and the plurality of RF circuits 827 may correspond to, for example, the plurality of antenna elements, respectively. Note that an example in which the wireless communication interface 825 includes the plurality of BB processors 826 and the plurality of RF circuits 827 has been illustrated in FIG. 26, but the wireless communication interface 825 may include a single BB processor 826 or a single RF circuit 827.

In the eNB 800 illustrated in FIG. 26, one or more components of the upper layer processing unit 101 and the control unit 103 described with reference to FIG. 2 may be implemented in the wireless communication interface 825. Alternatively, at least some of these components may be implemented in the controller 821. As an example, the eNB 800 may be mounted with a module including a part (for example, the BB processor 826) or the whole of the wireless communication interface 825 and/or the controller 821, and the one or more components may be implemented in the module. In this case, the module may store a program for causing a processor to function as the one or more components (in other words, a program for causing the processor to execute operations of the one or more components), and execute the program. As another example, the program for causing the processor to function as the one or more components may be installed in the eNB 800, and the wireless communication interface 825 (for example, the BB processor 826) and/or the controller 821 may execute the program. As described above, the eNB 800, the base station device 820, or the module may be provided or the program for causing the processor to function as the one or more components may be provided, as a device including the one or more components. Furthermore, a readable recording medium on which the program is recorded may be provided.

Furthermore, in the eNB 800 illustrated in FIG. 26, the reception unit 105 and the transmission unit 107 described with reference to FIG. 2 may be implemented in the wireless communication interface 825 (for example, the RF circuit 827). Furthermore, the transmission/reception antenna 109 may be implemented in the antenna 810.

Second Application Example

Figure 27:
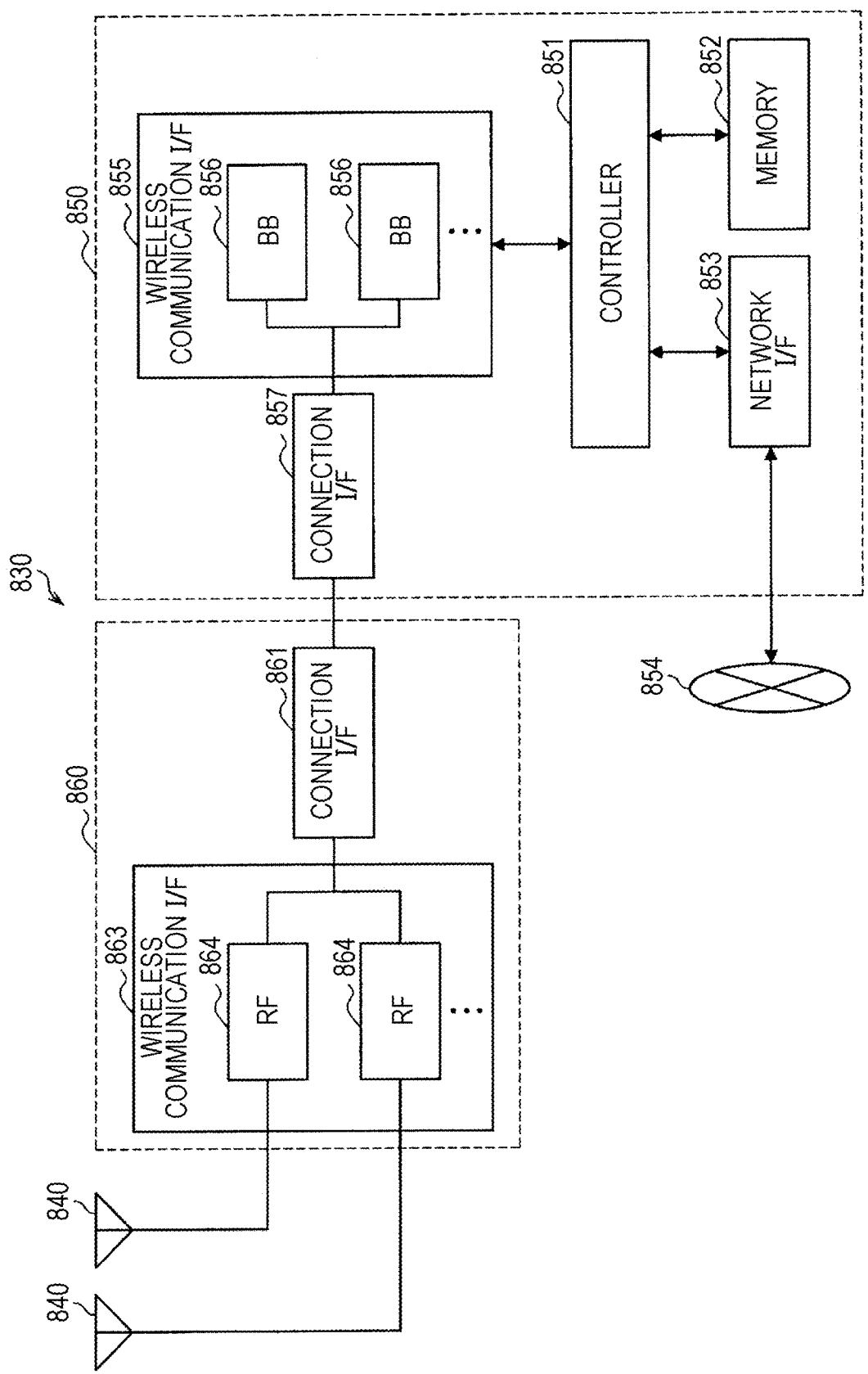
FIG. 27 is a block diagram illustrating a second example of a schematic configuration of an eNB.

FIG. 27 is a block diagram illustrating a second example of a schematic configuration of an eNB to which the technology according to the present disclosure can be applied. The eNB 830 includes one or more antennas 840, a base station device 850, and an RRH 860. Each antenna 840 and the RRH 860 can be connected to each other via a RF cable. Furthermore, the base station device 850 and the RRH 860 can be connected to each other by a high-speed line such as an optical fiber cable or the like.

Each of the antennas 840 has a single or a plurality of antenna elements (for example, a plurality of antenna elements configuring a MIMO antenna), and is used to transmit and receive a radio signal by the RRH 860. The eNB 830 includes a plurality of antennas 840 as illustrated in FIG. 27, and the plurality of antennas 840 may correspond to, for example, a plurality of frequency bands used by the eNB 830, respectively. Note that an example in which the eNB 830 includes the plurality of antennas 840 has been illustrated in FIG. 27, but the eNB 830 may include a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 26, respectively.

The wireless communication interface 855 supports any one cellular communication manner such as LTE, LTE-Advanced or the like, and provides a wireless connection to a terminal located in a sector corresponding to the RRH 860 via the RRH 860 and the antenna 840. The wireless communication interface 855 may typically include a BB processor 856 and the like. The BB processor 856 is similar to the BB processor 826 described with reference to FIG. 26 except that it is connected to an RF circuit 864 of the RRH 860 via the connection interface 857. The wireless communication interface 855 includes a plurality of BB processors 856 as illustrated in FIG. 26, and the plurality of BB processors 856 may correspond to, for example, the plurality of frequency bands used by the eNB 830, respectively. Note that an example in which the wireless communication interface 855 includes the plurality of BB processors 856 has been illustrated in FIG. 27, but the wireless communication interface 855 may include a single BB processor 856.

The connection interface 857 is an interface for connecting the base station device 850 (wireless communication interface 855) to the RRH 860. The connection interface 857 may be a communication module for communication on the high-speed line connecting the base station device 850 (wireless communication interface 855) and the RRH 860 to each other.

Furthermore, the RRH 860 also includes a connection interface 861 and a wireless communication interface 863.

The connection interface 861 is an interface for connecting the RRH 860 (wireless communication interface 863) to the base station device 850. The connection interface 861 may be a communication module for communication on the high-speed line.

The wireless communication interface 863 transmits and receives a radio signal via the antenna 840. The wireless communication interface 863 may typically include an RF circuit 864 and the like. The RF circuit 864 may include a mixer, a filter, an amplifier, and the like, and transmits and receives a radio signal via the antenna 840. The wireless communication interface 863 includes a plurality of RF circuits 864 as illustrated in FIG. 27, and the plurality of RF circuits 864 may correspond to, for example, the plurality of antenna elements, respectively. Note that an example in which the wireless communication interface 863 includes the plurality of RF circuits 864 has been illustrated in FIG. 27, but the wireless communication interface 863 may include a single RF circuit 864.

In the eNB 830 illustrated in FIG. 27, one or more components of the upper layer processing unit 101 and the control unit 103 described with reference to FIG. 2 may be implemented in the wireless communication interface 855 and/or the wireless communication interface 863. Alternatively, at least some of these components may be implemented in the controller 851. As an example, the eNB 830 may be mounted with a module including a part (for example, the BB processor 856) or the whole of the wireless communication interface 855 and/or the controller 851, and the one or more components may be implemented in the module. In this case, the module may store a program for causing a processor to function as the one or more components (in other words, a program for causing the processor to execute operations of the one or more components), and execute the program. As another example, the program for causing the processor to function as the one or more components may be installed in the eNB 830, and the wireless communication interface 855 (for example, the BB processor 856) and/or the controller 851 may execute the program. As described above, the eNB 830, the base station device 850, or the module may be provided or the program for causing the processor to function as the one or more components may be provided, as a device including the one or more components. Furthermore, a readable recording medium on which the program is recorded may be provided.

Furthermore, in the eNB 830 illustrated in FIG. 27, for example, the reception unit 105 and the transmission unit 107 described with reference to FIG. 2 may be implemented in the wireless communication interface 863 (for example, the RF circuit 864). Furthermore, the transmission/reception antenna 109 may be implemented in the antenna 840.

<4.2. Application Example Related to Terminal Device>

First Application Example

Figure 28:
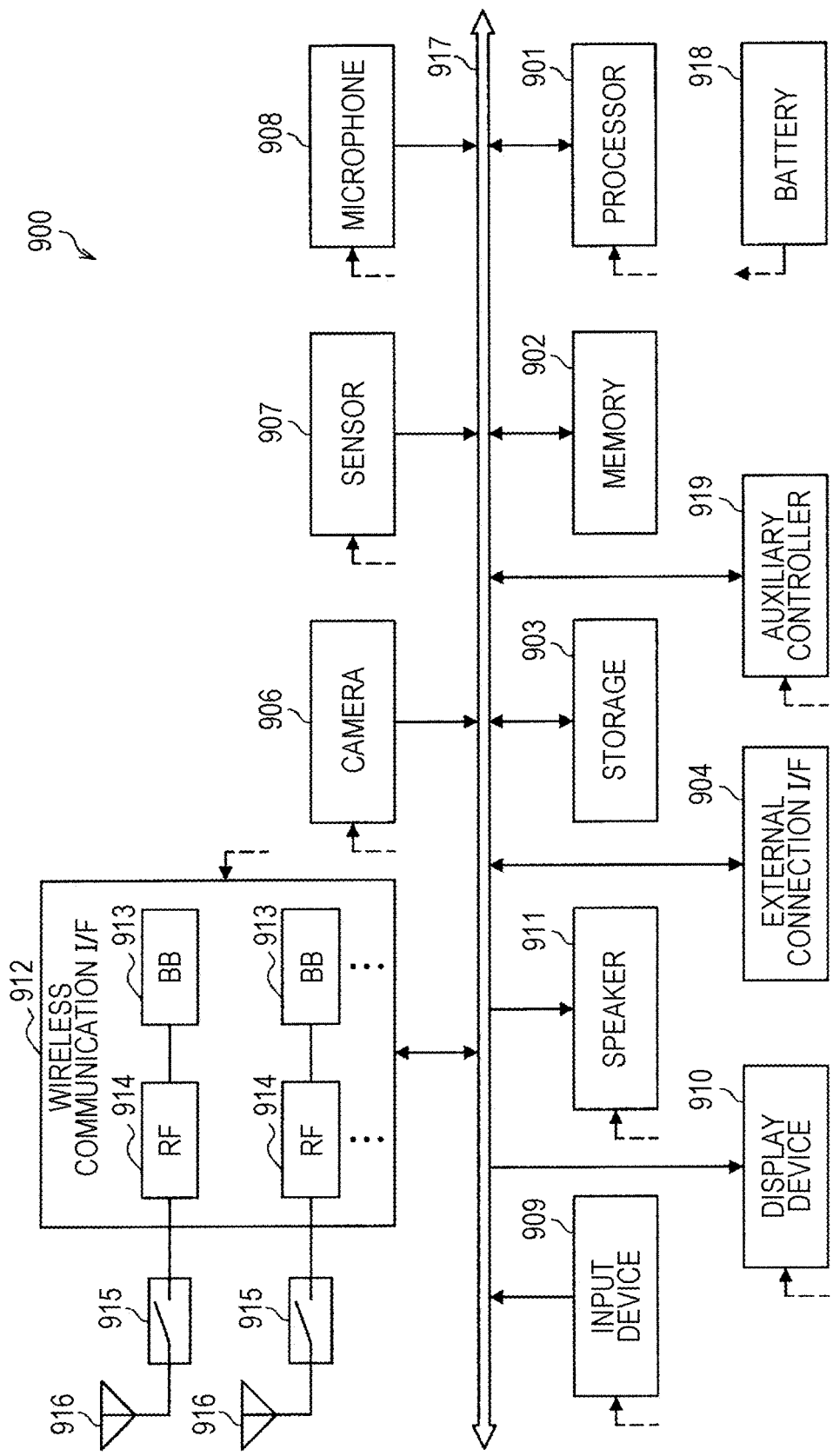
FIG. 28 is a block diagram illustrating an example of a schematic configuration of a smartphone.

FIG. 28 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and other layers of the smartphone 900. The memory 902 includes a RAM and a ROM, and stores a program executed by the processor 901 and data. The storage 903 can include a storage medium such as a semiconductor memory, a hard disk or the like. The external connection interface 904 is an interface for connecting an externally attached device such as a memory card, a universal serial bus (USB) device or the like to the smartphone 900.

The camera 906 includes, for example, an imaging element such as a charge coupled device (CCD), a complementary metal oxide semiconductor (CMOS), or the like, and generates a captured image. The sensor 907 can include a sensor group such as, for example, a positioning sensor, a gyro sensor, a geomagnetic sensor, an acceleration sensor, and the like. The microphone 908 converts a sound input into the smartphone 900 to an audio signal. The input device 909 includes, for example, a touch sensor that detects a touch on a screen of the display device 910, a keypad, a keyboard, a button, a switch, or the like, and accepts an operation or an information input from a user. The display device 910 includes a screen such as a liquid crystal display (LCD), an organic light emitting diode (OLED) display, or the like, and displays an output image of the smartphone 900. The speaker 911 converts an audio signal output from the smartphone 900 to a sound.

The wireless communication interface 912 supports any one cellular communication manner such as LTE, LTE-Advanced, or the like, and executes wireless communication. The wireless communication interface 912 can typically include a BB processor 913, an RF circuit 914, and the like. The BB processor 913 may perform, for example, coding/decoding, modulation/demodulation, multiplexing/demultiplexing, and the like, and performs various signal processing for wireless communication. Meanwhile, the RF circuit 914 may include a mixer, a filter, an amplifier, and the like, and transmits and receives a radio signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 28. Note that an example in which the wireless communication interface 912 includes the plurality of BB processors 913 and the plurality of RF circuits 914 has been illustrated in FIG. 28, but the wireless communication interface 912 may include a single BB processor 913 or a single RF circuit 914.

Moreover, the wireless communication interface 912 may support other types of wireless communication manners such as a short-range wireless communication manner, a near field wireless communication manner, a wireless local area network (LAN) manner, or the like, in addition to the cellular communication manner. In that case, the wireless communication interface 912 may include the BB processor 913 and the RF circuit 914 for every wireless communication manner.

Each of the antenna switches 915 switches a connection destination of the antenna 916 among a plurality of circuits (for example, circuits for different wireless communication manners) included in the wireless communication interface 912.

Each of the antennas 916 has a single or a plurality of antenna elements (for example, a plurality of antenna elements configuring a MIMO antenna), and is used to transmit and receive a radio signal by the wireless communication interface 912. The smartphone 900 may include a plurality of antennas 916 as illustrated in FIG. 28. Note that an example in which the smartphone 900 includes the plurality of antennas 916 has been illustrated in FIG. 28, but the smartphone 900 may include a single antenna 916.

Moreover, the smartphone 900 may include the antenna 916 for every wireless communication manner. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 illustrated in FIG. 28 via a feeder line partially illustrated as a broken line in FIG. 28. The auxiliary controller 919 operates a minimum necessary function of the smartphone 900 in, for example, a sleep mode.

In the smartphone 900 illustrated in FIG. 28, one or more components of the upper layer processing unit 201 and the control unit 203 described with reference to FIG. 3 may be implemented in the wireless communication interface 912. Alternatively, at least some of these components may be implemented in the processor 901 or the auxiliary controller 919. As an example, the smartphone 900 may be mounted with a module including a part (for example, the BB processor 913) or the whole of the wireless communication interface 912, the processor 901, and/or the auxiliary controller 919, and the one or more components may be implemented in the module. In this case, the module may store a program for causing a processor to function as the one or more components (in other words, a program for causing the processor to execute operations of the one or more components), and execute the program. As another example, the program for causing the processor to function as the one or more components may be installed in the smartphone 900, and the wireless communication interface 912 (for example, the BB processor 913), the processor 901, and/or the auxiliary controller 919 may execute the program. As described above, the smartphone 900 or the module may be provided or the program for causing the processor to function as the one or more components may be provided, as a device including the one or more components. Furthermore, a readable recording medium on which the program is recorded may be provided.

Furthermore, in the smartphone 900 illustrated in FIG. 28, for example, the reception unit 205 and the transmission unit 207 described with reference to FIG. 3 may be implemented in the wireless communication interface 912 (for example, the RF circuit 914). Furthermore, the transmission/reception antenna 209 may be implemented in the antenna 916.

Second Application Example

Figure 29:
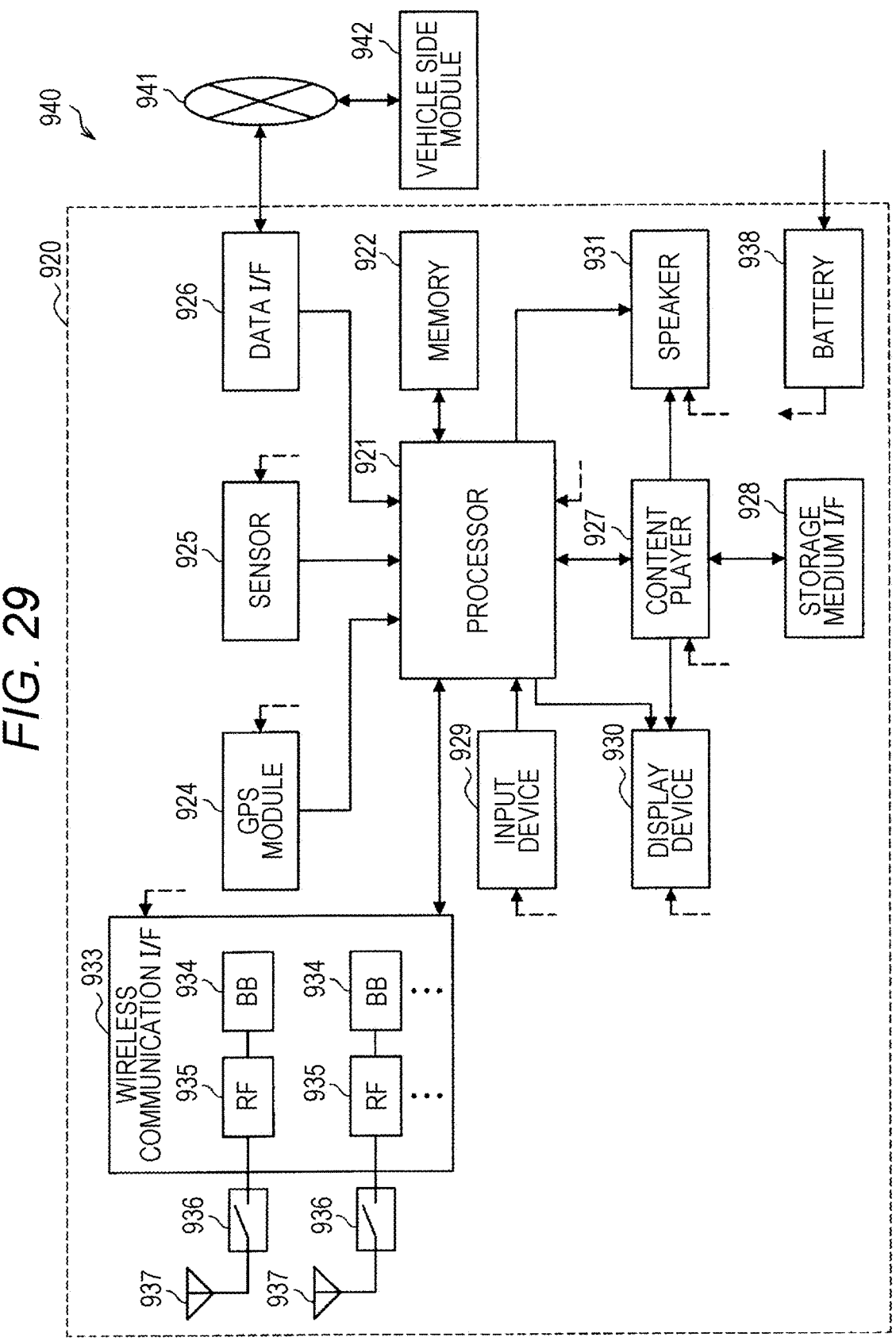
FIG. 29 is a block diagram illustrating an example of a schematic configuration of a car navigation device.

FIG. 29 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls a navigation function and the other functions of the car navigation device 920. The memory 922 includes a RAM and a ROM, and stores a program executed by the processor 921 and data.

The GPS module 924 measures a position (for example, a latitude, a longitude, and an altitude) of the car navigation device 920 using a GPS signal received from a GPS satellite.

The sensor 925 can include a sensor group such as, for example, a gyro sensor, a geomagnetic sensor, a barometric sensor, and the like. The data interface 926 is, for example, connected to an in-vehicle network 941 via a terminal (not illustrated), and acquires data such as vehicle speed data or the like generated on a vehicle side.

The content player 927 plays a content stored in a storage medium (for example, a compact disk (CD) or a digital versatile disk (DVD)) inserted into the storage medium interface 928. The input device 929 includes, for example, a touch sensor that detects a touch on a screen of the display device 930, a button, a switch, or the like, and accepts an operation or an information input from a user. The display device 930 includes a screen such as an LCD, an OLED display or the like, and displays an image of a navigation function or the played content. The speaker 931 outputs a sound of the navigation function or the played content.

The wireless communication interface 933 supports any one cellular communication manner such as LTE, LTE-Advanced, or the like, and executes wireless communication. The wireless communication interface 933 can typically include a BB processor 934, an RF circuit 935, and the like. The BB processor 934 may perform, for example, coding/decoding, modulation/demodulation, multiplexing/demultiplexing, and the like, and performs various signal processing for wireless communication. Meanwhile, the RF circuit 935 may include a mixer, a filter, an amplifier, and the like, and transmits and receives a radio signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 29. Note that an example in which the wireless communication interface 933 includes the plurality of BB processors 934 and the plurality of RF circuits 935 has been illustrated in FIG. 29, but the wireless communication interface 933 may include a single BB processor 934 or a single RF circuit 935.

Moreover, the wireless communication interface 933 may support other types of wireless communication manners such as a short-range wireless communication manner, a near field wireless communication manner, a wireless LAN manner, or the like, in addition to the cellular communication manner. In that case, the wireless communication interface 933 may include the BB processor 934 and the RF circuit 935 for every wireless communication manner.

Each of the antenna switches 936 switches a connection destination of the antenna 937 among a plurality of circuits (for example, circuits for different wireless communication manners) included in the wireless communication interface 933.

Each of the antennas 937 has a single or a plurality of antenna elements (for example, a plurality of antenna elements configuring a MIMO antenna), and is used to transmit and receive a radio signal by the wireless communication interface 933. The car navigation device 920 may include a plurality of antennas 937 as illustrated in FIG. 29. Note that an example in which the car navigation device 920 includes the plurality of antennas 937 has been illustrated in FIG. 29, but the car navigation device 920 may include a single antenna 937.

Moreover, the car navigation device 920 may include the antenna 937 for every wireless communication manner. In that case, the antenna switch 936 may be omitted from the configuration of the car navigation device 920.

The battery 938 supplies power to each block of the car navigation device 920 illustrated in FIG. 29 via a feeder line partially illustrated as a broken line in FIG. 29. Furthermore, the battery 938 accumulates power supplied from the vehicle side.

In the car navigation device 920 illustrated in FIG. 29, one or more components of the upper layer processing unit 201 and the control unit 203 described with reference to FIG. 3 may be implemented in the wireless communication interface 933. Alternatively, at least some of these components may be implemented in the processor 921. As an example, the car navigation device 920 may be mounted with a module including a part (for example, the BB processor 934) or the whole of the wireless communication interface 933 and/or the processor 921, and the one or more components may be implemented in the module. In this case, the module may store a program for causing a processor to function as the one or more components (in other words, a program for causing the processor to execute operations of the one or more components), and execute the program. As another example, the program for causing the processor to function as the one or more components may be installed in the car navigation device 920, and the wireless communication interface 933 (for example, the BB processor 934) and/or the processor 921 may execute the program. As described above, the car navigation device 920 or the module may be provided or the program for causing the processor to function as the one or more components may be provided, as a device including the one or more components. Furthermore, a readable recording medium on which the program is recorded may be provided.

Furthermore, in the car navigation device 920 illustrated in FIG. 29, for example, the reception unit 205 and the transmission unit 207 described with reference to FIG. 3 may be implemented in the wireless communication interface 933 (for example, the RF circuit 935). Furthermore, the transmission/reception antenna 209 may be implemented in the antenna 937.

Furthermore, the technology according to the present disclosure may also be realized as an in-vehicle system (or a vehicle) 940 including one or more blocks of the car navigation device 920 described above, the in-vehicle network 941, and a vehicle side module 942. That is, the in-vehicle system (or the vehicle) 940 may be provided as a device including at least one of the upper layer processing unit 201, the control unit 203, the reception unit 205, or the transmission unit 207. The vehicle side module 942 generates vehicle side data such as a vehicle speed, an engine speed, trouble information, or the like, and outputs the generated data to the in-vehicle network 941.

5. End

As described above, in the system according to the embodiment of the present disclosure, a communication device includes a communication unit that performs wireless communication and a control unit that controls inter-device communication between different terminal devices. The control unit performs control so that a plurality of synchronization signals associated with each of a plurality of beams allocated to be available for the inter-device communication is patterned and arranged in regions to which resources of the wireless communication are allocated and is transmitted to another terminal device. Furthermore, the control unit performs control so that a pattern in which the plurality of synchronization signals is arranged is switched according to a predetermined condition.

With the configuration as described above, according to the system according to the embodiment of the present disclosure, it becomes possible to establish inter-terminal communication between terminal devices more rapidly even in a situation with beam connection under the HD restriction like inter-terminal communication (for example, V2X communication typified by V2V) in which application of NR is assumed. That is, according to the system according to the embodiment of the present disclosure, it becomes possible to realize the establishment of the inter-terminal communication in which the application of the NR is assumed, in a more suitable manner.

Furthermore, in the system according to the embodiment of the present disclosure, a communication device includes a communication unit that performs wireless communication and a control unit that controls inter-device communication between different terminal devices. The control unit independently controls a first transmission timing of first communication (for example, unicast) with destination designation and a second transmission timing of second communication (for example, broadcast) without destination designation among the inter-device communication.

With the configuration as described above, according to the system according to the embodiment of the present disclosure, it becomes possible to establish communication with destination designation such as the unicast more rapidly in inter-terminal communication (for example, V2X communication typified by V2V) in which application of NR is assumed. That is, according to the system according to the embodiment of the present disclosure, it becomes possible to realize the establishment of the inter-terminal communication in which the application of the NR is assumed, in a more suitable manner.

Hereinabove, the preferred embodiments of the present disclosure have been described in detail with reference to the accompanying drawings, but a technical scope of the present disclosure is not limited to such examples. It will be apparent to those skilled in the art of the present disclosure that various modifications or alterations can be conceived within the scope of the technical idea described in the claims, and it is naturally understood that these modifications or alterations also fall within the technical scope of the present disclosure.

Furthermore, the effects described in the present specification are merely illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)

A communication device including:

a communication unit that performs wireless communication; and a control unit that performs control so that a plurality of synchronization signals is patterned and arranged in regions to which resources of the wireless communication are allocated and is transmitted to another terminal device, the plurality of synchronization signals being associated with each of a plurality of beams allocated to be available for inter-device communication between different terminal devices, in which the control unit performs control so that a pattern in which the plurality of synchronization signals is arranged is switched according to a predetermined condition.

(2)

The communication device according to the above (1), in which the control unit performs control so that notification of information regarding the pattern after being switched is provided to the another terminal device.

(3)

The communication device according to the above (2), in which the control unit performs control so that notification of the information regarding the pattern after being switched is provided to the another terminal device, in a case where the pattern is switched.

(4)

The communication device according to the above (2) or (3), in which the control unit performs control so that the pattern is switched at a predetermined timing, and performs control so that notification of the information regarding the pattern after being switched is provided to the another terminal devices before the pattern is switched.

(5)

The communication device according to any one of the above (2) to (4), in which the information regarding the pattern after being switched includes at least one of information regarding the beam associated with each of the plurality of synchronization signals, information regarding a terminal device of a transmission source, or information regarding the number of synchronization signals transmitted in one cycle.

(6)

The communication device according to any one of the above (2) to (5), in which the control unit performs control so that notification of information in which the pattern is indicated by a bitmap is provided to the another terminal device as the information regarding the pattern after being switched.

(7)

The communication device according to any one of the above (1) to (6), in which the control unit performs control so that the pattern is switched on the basis of an instruction from another communication device.

(8)

The communication device according to the above (7), in which the another communication device is a base station.

(9)

The communication device according to the above (7), in which the another communication device is another terminal device having authority regarding control of the inter-device communication.

(10)

The communication device according to any one of the above (1) to (9), in which the control unit performs control so that the pattern is switched on the basis of a request from the another terminal device.

(11)

The communication device according to the above (10), in which the control unit performs control so that the pattern is switched according to a reception timing of the another terminal device in the inter-device communication.

(12)

The communication device according to any one of the above (1) to (11), in which the control unit sets a plurality of synchronization signal sets with which the plurality of synchronization signals is associated, respectively, and performs control so that the pattern in which the plurality of synchronization signals is arranged is switched by switching the synchronization signal set used for transmitting the plurality of synchronization signals to the another terminal device.

(13)

The communication device according to any one of the above (1) to (12), in which a timing advance value for the another terminal device to designate a destination and transmit data by the inter-device communication is calculated on the basis of a synchronization signal selected by the another terminal device among the plurality of synchronization signals.

(14)

The communication device according to the above (13), in which the control unit performs control so that a signal for timing advance adjustment corresponding to the synchronization signal selected by the another terminal device is received from the another terminal device, and performs control so that the timing advance value according to a reception result of the signal (15)

The communication device according to the above (13), in which the control unit performs frame synchronization with the another terminal device on the basis of a reception result of a predetermined signal, and performs control so that a signal for timing advance adjustment is transmitted to the another terminal device as the synchronization signal at a timing according to a result of the frame synchronization, and the timing advance value is calculated on the basis of a reception result of the signal for timing advance adjustment by the another terminal device.

(16)

The communication device according to the above (15), in which the control unit performs control so that the frame synchronization is performed on the basis of at least one of a global navigation satellite system (GNSS) signal, a downlink signal transmitted from a base station, or a signal transmitted from a terminal device having authority regarding control of the inter-device communication.

(17)

The communication device according to any one of the above (1) to (16), in which the control unit controls the number of the plurality of synchronization signals according to a predetermined condition when the pattern is switched.

(18)

The communication device according to any one of the above (1) to (17), in which the control unit controls allocation of resources for the another terminal device to transmit data via the inter-device communication.

(19)

The communication device according to any one of the above (1) to (18), in which the inter-device communication is communication based on a communication manner of switching and performing transmission and reception in a time division manner.

(20)

A communication device including:

a communication unit that performs wireless communication; and a control unit performs control so that a plurality of synchronization signals transmitted another terminal device and associated with each of a plurality of beams allocated to be available for inter-device communication between different terminal devices is received, in which the control unit performs control so that information regarding switching of a pattern in which the plurality of synchronization signals is arranged in regions to which resources of the wireless communication are allocated is acquired from the another terminal device, in a case where the pattern is switched.

(21)

A communication method executed by a computer, including:

performing wireless communication;

performing control so that a plurality of synchronization signals is patterned and arranged in regions to which resources of the wireless communication are allocated and is transmitted to another terminal device, the plurality of synchronization signals being associated with each of a plurality of beams allocated to be available for inter-device communication between different terminal devices; and performing control so that a pattern in which the plurality of synchronization signals is arranged is switched according to a predetermined condition.

(22)

A communication method executed by a computer, including:

performing wireless communication;

performing control so that a plurality of synchronization signals transmitted from another terminal device and associated with each of a plurality of beams allocated to be available for inter-device communication between different terminal devices is received; and performing control so that information regarding switching of a pattern in which the plurality of synchronization signals is arranged in regions to which resources of the wireless communication are allocated is acquired from the another terminal device, in a case where the pattern is switched.

(23)

A program for causing a computer to execute the following steps of:

performing wireless communication;

performing control so that a plurality of synchronization signals is patterned and arranged in regions to which resources of the wireless communication are allocated and is transmitted to another terminal device, the plurality of synchronization signals being associated with each of a plurality of beams allocated to be available for inter-device communication between different terminal devices; and performing control so that a pattern in which the plurality of synchronization signals is arranged is switched according to a predetermined condition.

(24)

A program for causing a computer to execute the following steps of:

performing wireless communication;

performing control so that a plurality of synchronization signals transmitted from another terminal device and associated with each of a plurality of beams allocated to be available for inter-device communication between different terminal devices is received; and performing control so that information regarding switching of a pattern in which the plurality of synchronization signals is arranged in regions to which resources of the wireless communication are allocated is acquired from the another terminal device, in a case where the pattern is switched.

(25)

A communication device including:

a communication unit that performs wireless communication; and a control unit that independently controls a first transmission timing of first communication with destination designation and a second transmission timing of second communication without destination designation among inter-device communication between different terminal devices.

(26)

The communication device according to the above (25), in which the communication device is a terminal device, and the control unit controls the first transmission timing related to data transmission to another terminal device based on the first communication.

(27)

The communication device according to the above (26), in which the control unit calculates a timing advance value on the basis of a reception result of a signal for timing advance adjustment transmitted from the another terminal device, and controls the first transmission timing related to the data transmission to the another terminal device based on the first communication by performing control so that notification of the timing advance value is provided to the another terminal device.

(28)

The communication device according to the above (26), in which the control unit performs frame synchronization with the another terminal device on the basis of a reception result of a predetermined signal, and controls the first transmission timing related to the data transmission to the another terminal device based on the first communication by performing control so that the signal for timing advance adjustment is transmitted to the another terminal device at a timing according to a result of the frame synchronization.

(29)

The communication device according to the above (25), in which the communication device is a terminal device, and the control unit controls the first transmission timing related to data transmission by another terminal device based on the first communication.

(30)

The communication device according to the above (25), in which the communication device is a base station, and the control unit controls the first transmission timing related to data transmission to a second terminal device by a first terminal device based on the first communication.

(31)

A communication method executed by a computer, including:

performing wireless communication; and independently controlling a first transmission timing of first communication with destination designation and a second transmission timing of second communication without destination designation among inter-device communication between different terminal devices.

(32)

A program for causing a computer to execute the following steps of:

performing wireless communication; and independently controlling a first transmission timing of first communication with destination designation and a second transmission timing of second communication without destination designation among inter-device communication between different terminal devices.

REFERENCE SIGNS LIST

1 Base station device
101 Upper layer processing unit
103 Control unit
105 Reception unit
1051 Decoding unit
1053 Demodulating unit
1055 Demultiplexing unit
1057 Wireless receiving unit
1059 Channel measuring unit
107 Transmission unit
1071 Coding unit
1073 Modulating unit
1075 Multiplexing unit
1077 Wireless transmitting unit
1079 Link reference signal generating unit
109 Transmission/reception antenna
2 Terminal device
201 Upper layer processing unit
203 Control unit
205 Reception unit
2051 Decoding unit
2053 Demodulating unit
2055 Demultiplexing unit
2057 Wireless receiving unit
2059 Channel measuring unit
207 Transmission unit
2071 Coding unit
2073 Modulating unit
2075 Multiplexing unit
2077 Wireless transmitting unit
2079 Link reference signal generating unit
209 Transmission/reception antenna

The invention claimed is:

1. A communication device comprising:

a transceiver that performs wireless communication; and circuitry configured to arrange a plurality of synchronization signals in a pattern according to regions to which resources of the wireless communication are allocated and is transmitted to another terminal device, the plurality of synchronization signals being associated with each of a plurality of beams allocated to be available for inter-device communication between different terminal devices, and switch the pattern of the plurality of synchronization signals to a different pattern in response to an occurrence of a predetermined condition.

2. The communication device according to claim 1, wherein the circuitry is configured to control the transceiver to notify the another terminal device of the different pattern.

3. The communication device according to claim 2, wherein the circuitry is configured to control the transceiver to notify the another terminal device after the pattern is switched to the different pattern.

4. The communication device according to claim 2, wherein the circuitry is further configured to switch the pattern to the different pattern at a predetermined timing, and control the transceiver to notify another terminal device prior to the another terminal device receiving the different pattern.

5. The communication device according to claim 2, wherein information regarding the different pattern provided by the transceiver includes at least one of
information regarding a beam associated with each of the plurality of synchronization signals,
information regarding a terminal device of a transmission source, or
information regarding a number of synchronization signals transmitted in one cycle.

6. The communication device according to claim 2, wherein information regarding the different pattern is provided by the transceiver as a bitmap.

7. The communication device according to claim 1, wherein the circuitry is configured to switch the pattern in response to receiving an instruction from another communication device.

8. The communication device according to claim 7, wherein the another communication device is a base station.

9. The communication device according to claim 7, wherein the another communication device is another terminal device having authority regarding control of the inter-device communication.

10. The communication device according to claim 1, wherein the circuitry is configured to switch the pattern in response to receiving a request from the another terminal device.

11. The communication device according to claim 10, wherein the circuitry is configured to switch the pattern in response to a reception timing of the another terminal device in the inter-device communication.

12. The communication device according to claim 1, wherein the circuitry is configured to
set a plurality of synchronization signal sets with which the plurality of synchronization signals is associated, respectively, and
perform control so that the pattern in which the plurality of synchronization signals is arranged is switched by switching a synchronization signal set used for transmitting the plurality of synchronization signals to the another terminal device.

13. The communication device according to claim 1, wherein a timing advance value for the another terminal device to designate a destination and transmit data by the inter-device communication is calculated on a basis of a synchronization signal selected by the another terminal device among the plurality of synchronization signals.

14. The communication device according to claim 13, wherein the circuitry is configured to
perform control so that a signal for timing advance adjustment corresponding to the synchronization signal selected by the another terminal device is received from the another terminal device, and
perform control so that notification of the timing advance value according to a reception result of the signal for timing advance adjustment is provided to the another terminal device.

15. The communication device according to claim 13, wherein the circuitry is configured to
perform frame synchronization with the another terminal device on a basis of a reception result of a predetermined signal, and
perform control so a signal for timing advance adjustment is transmitted to the another terminal device as the synchronization signal at a timing according to a result of the frame synchronization, and
the timing advance value is calculated on a basis of a reception result of the signal for timing advance adjustment by the another terminal device.

16. The communication device according to claim 15, wherein the circuitry is configured to perform control so that the frame synchronization is performed on a basis of at least one of a global navigation satellite system (GNSS) signal, a downlink signal transmitted from a base station, or a signal transmitted from a terminal device having authority regarding control of the inter-device communication.

17. The communication device according to claim 1, wherein the circuitry is configured to control a number of the plurality of synchronization signals according to a predetermined condition when the pattern is switched.

18. The communication device according to claim 1, wherein the circuitry is configured to control allocation of resources for the another terminal device to transmit data via the inter-device communication.

19. A communication method comprising:
performing wireless communication with a transceiver having a controller;
arranging, with the controller, a plurality of synchronization signals in a pattern according to regions to which resources of the wireless communication are allocated;
transmitting the synchronization signals to another terminal device, the plurality of synchronization signals being associated with each of a plurality of beams allocated to be available for inter-device communication between different terminal devices; and
according to a predetermined condition, switching the pattern of the plurality of synchronization signals to a different pattern.

20. A non-transitory computer readable storage device having stored therein computer-readable instructions that when executed by a processor cause the processor to execute a method, the method comprising:
performing wireless communication with a transceiver;
arranging a plurality of synchronization signals in a pattern according to regions to which resources of the wireless communication are allocated;
transmitting the synchronization signals to another terminal device, the plurality of synchronization signals being associated with each of a plurality of beams allocated to be available for inter-device communication between different terminal devices; and
according to a predetermined condition, switching the pattern of the plurality of synchronization signals to a different pattern.

* * * * *